(12) United States Patent
Haynes et al.

(10) Patent No.: US 10,502,435 B2
(45) Date of Patent: Dec. 10, 2019

(54) SOLAR THERMAL ROOFING SYSTEM

(71) Applicant: Zinniatek Limited, Rosedale, Auckland (NZ)

(72) Inventors: Andrew Haynes, Auckland (NZ);
Ashton Partridge, Auckland (NZ);
Daniel Fernandez, Auckland (NZ);
Johan Kvasnicka, Auckland (NZ);
David Bates, Auckland (NZ);
Christopher Morrow, Auckland (NZ)

(73) Assignee: ZinniaTek Limited, Auckland (NZ)

( * ) Notice: Subject to any disclaimer, the term of this patent is extended or adjusted under 35 U.S.C. 154(b) by 168 days.

(21) Appl. No.: 15/118,778

(22) PCT Filed: Mar. 5, 2015

(86) PCT No.: PCT/IB2015/051624
§ 371 (c)(1),
(2) Date: Aug. 12, 2016

(87) PCT Pub. No.: WO2015/132756
PCT Pub. Date: Sep. 11, 2015

(65) Prior Publication Data
US 2017/0059184 A1    Mar. 2, 2017

Related U.S. Application Data

(60) Provisional application No. 61/949,482, filed on Mar. 7, 2014.

(51) Int. Cl.
*F24D 5/00* (2006.01)
*F24D 5/10* (2006.01)
(Continued)

(52) U.S. Cl.
CPC ............... *F24D 5/005* (2013.01); *F24D 5/10* (2013.01); *F24F 7/02* (2013.01); *F24S 10/30* (2018.05);
(Continued)

(58) Field of Classification Search
CPC ........................................................ F24F 7/02
(Continued)

(56) References Cited

U.S. PATENT DOCUMENTS 2,680,565 A   6/1954 Lof
3,223,018 A   12/1965 Tucker, Sr.
(Continued)

FOREIGN PATENT DOCUMENTS

CA   2849258   3/2013
CN   1261417   7/2000
(Continued)

OTHER PUBLICATIONS

English Translation of the First Office Action, 103034-0126, dated Sep. 4, 2017, 8 pages.
(Continued)

*Primary Examiner* — Avinash A Savani
*Assistant Examiner* — Rabeeul I Zuberi
(74) *Attorney, Agent, or Firm* — Foley & Lardner LLP

(57) ABSTRACT

A solar thermal control system includes a membrane configured to receive solar energy, wherein the membrane is configured to form a cavity between the membrane and an outer surface of a structure by coupling to the outer surface, and wherein the solar energy is configured to heat air within the cavity. The control system also includes a thermal collection unit configured to connect to the cavity and receive and direct air from the cavity, and a ducting system coupled to the thermal collection unit and configured to
(Continued)

direct air from the thermal collection unit to at least one of the interior of the structure and a vent.

17 Claims, 32 Drawing Sheets

(51) Int. Cl.
*F24J 2/46* (2006.01)
*F24F 7/02* (2006.01)
*F24S 20/67* (2018.01)
*F24S 10/30* (2018.01)
*F24S 20/69* (2018.01)

(52) U.S. Cl.
CPC ............... *F24S 20/67* (2018.05); *F24S 20/69* (2018.05); *F24D 2200/14* (2013.01); *Y02B 10/20* (2013.01); *Y02E 10/44* (2013.01)

(58) Field of Classification Search
USPC ............... 52/535, 553; 165/52, 55, 53, 48.2; 126/621–623
See application file for complete search history.

(56) References Cited

U.S. PATENT DOCUMENTS

| | | | |
|---|---|---|---|
| 4,173,243 A | 11/1979 | Wiegand | |
| 4,201,196 A | 5/1980 | Zani | |
| 4,281,639 A | 8/1981 | Kuronen | |
| 5,104,770 A * | 4/1992 | Usifer | G03F 7/0045 430/270.1 |
| 5,487,247 A | 1/1996 | Pigg | |
| 6,061,978 A | 5/2000 | Dinwoodie | |
| 8,100,341 B1 | 1/2012 | Roderick et al. | |
| 8,782,967 B2 * | 7/2014 | Daniels | E04D 1/30 454/250 |
| 9,182,136 B2 | 11/2015 | Oaten et al. | |
| 2002/0117166 A1 | 8/2002 | Okumura | |
| 2004/0020528 A1 | 2/2004 | Patwardhan | |
| 2012/0024283 A1 * | 2/2012 | Skillman | F24J 2/50 126/708 |
| 2012/0149291 A1 | 6/2012 | Roderick et al. | |

FOREIGN PATENT DOCUMENTS

| | | |
|---|---|---|
| JP | 06-212742 A | 8/1994 |
| JP | H07217011 A | 8/1995 |
| JP | H07218002 A | 8/1995 |
| JP | 08-068566 A | 3/1996 |
| JP | 09-032141 A | 2/1997 |
| JP | H0960981 | 3/1997 |
| JP | H0972618 A | 3/1997 |
| JP | 11-006231 A | 3/1999 |
| JP | 2006-022481 A | 1/2006 |
| JP | 2008-180414 A | 8/2008 |
| JP | 2009-127921 A | 6/2009 |
| JP | 6060652 B2 | 1/2017 |
| WO | WO-2008/070907 A1 | 6/2008 |

OTHER PUBLICATIONS

International Search Report, WO2015/132756, dated Jun. 25, 2015, 2 pages.
Extended European search report regarding Appl. No. EP 15757674.5 dated Sep. 29, 2017, 8 pps.
International Preliminary Report on Patentability for PCT Application No. PCT/IB2015/051624, dated Sep. 22, 2016, 6 pages.
Examination Report regarding European Appl. No. 15757674.5, dated Aug. 23, 2018, 5 pages.
Examination Report on Australian App. No. 2015225768 dated Nov. 2, 2018, 3 pages.
Translation of Examination Report on Japanese App. No. 2016-554856 dated Dec. 4, 2018, 3 pages.
Translation of Foreign Office Action regarding Application No. JP 2016-554856 dated Jun. 18, 2019, 4 pps.

* cited by examiner

Energy Data Collected for Consecutive Winter Days in Auckland NZ

| Day | Global Rad (kWh/m2day) | Air Energy (kWh/m2day) | Air Energy (kWh/day) | Air Efficiency (%) | Air Flow (m³/h) |
|---|---|---|---|---|---|
| 1 | 5.72 | 0.77 | 10.73 | 13.41 | 252 |
| 2 | 6.12 | 1.19 | 16.62 | 19.39 | 324 |
| 3 | 5.41 | 1.10 | 15.47 | 20.44 | 288 |
| 4 | 3.84 | 0.65 | 9.23 | 17.16 | 252 |
| 5 | 3.16 | 0.67 | 9.47 | 21.35 | 252 |
| 6 | 5.25 | 0.80 | 11.28 | 15.32 | 252 |
| 7 | 5.13 | 0.70 | 9.86 | 13.72 | 252 |

Configuration 1: Heat Exchanger

Configuration 2: Heat Pump with Ambient Air
Configuration 3: Heat Pump with Roof Air

Table 1. Performance of the Different Configurations

|  | Thermal Energy (kWh) | Energy Consumed (kWh) | COP |
|---|---|---|---|
| HEX | 1.00 | 0.12 | 8.06 |
| HP with Ambient Air | 1.59 | 0.61 | 2.60 |
| HP with Roof Air | 1.83 | 0.60 | 3.03 |
| HEX+HP Parallel | 1.76 | 0.47 | 3.77 |
| HEX+HP Series | 1.61 | 0.46 | 3.50 |

FIG. 35A

Table 2. Water Heating Process with the Different Configurations

|  | Water T from (°c) | Water T to (°c) | Time (min) |
|---|---|---|---|
| HEX | 21.5 | 44.2 | 90 |
| HP with ambient air | 26.4 | 49.9 | 70 |
| HP with roof air | 22 | 49.7 | 50 |
| HEX+HP Parallel | 23.5 | 49.7 | 35 |
| HEX+HP Series | 24.2 | 50.1 | 35 |

FIG. 35B

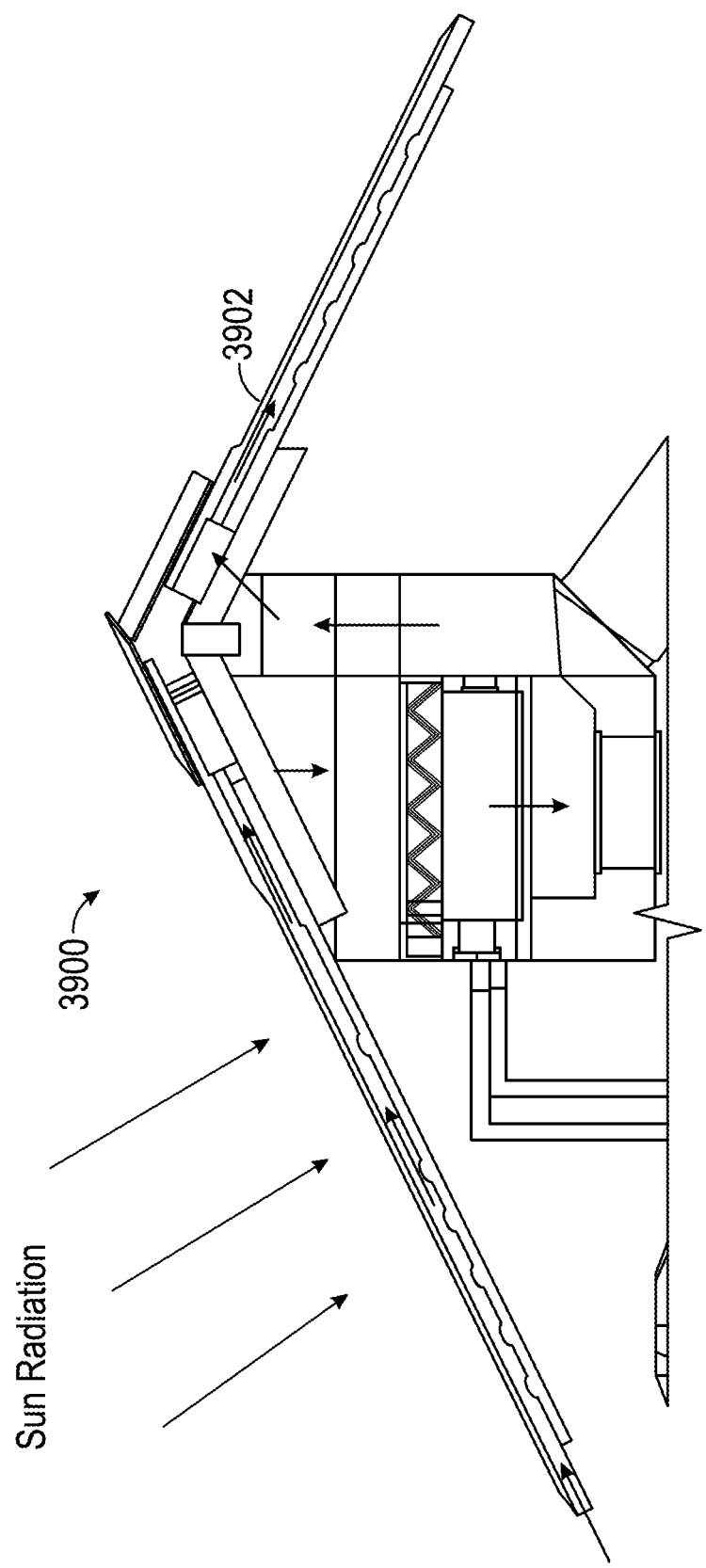

SOLAR THERMAL ROOFING SYSTEM

CROSS-REFERENCE TO RELATED APPLICATIONS

The present application is a National Stage of International Application No. PCT/IB2015/051624, filed Mar. 5, 2015, which claims the benefit of and priority to U.S. Provisional Patent Application No. 61/949,482, filed Mar. 7, 2014, both of which are incorporated herein by reference in their entireties.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Solar thermal collection systems collect solar energy from the solar spectrum as heat via a thermal collector. For instance, a solar thermal collection system may be installed on the roof of a building in order to collect solar energy used to heat water or the environment within the building. However, the systems may be bolted onto existing roofs and/or walls with mounting brackets or other hardware. These types of systems are typically not integrated into the structure of the building and are not able to efficiently collect and provide solar energy to the building.

SUMMARY

An embodiment of the present disclosure relates to a solar thermal control system. The control system includes a membrane configured to receive solar energy, wherein the membrane is configured to form a cavity between the membrane and an outer surface of a structure by coupling to the outer surface, and wherein the solar energy is configured to heat air within the cavity. The membrane may include feet (e.g., integrated or separately installed as a packer) configured to contact the outer surface to raise the membrane a distance above the outer surface and form the cavity. The distance above the outer surface and the size of the cavity may be directly related to a height of the feet.

The control system also includes a thermal collection unit configured to connect to the cavity and receive and direct air from the cavity. The thermal collection unit may include a hood having flanges configured to attach to the outer surface. The flanges are configured to match a pitch of the outer surface. The thermal collection unit may also include a heat exchange module and a fan module. The fan module is configured to drive air through the system. The system also includes a ducting system coupled to the thermal collection unit and configured to direct air from the thermal collection unit to at least one of the interior of the structure and a vent. The system may also include a venting ridge configured to receive air from the thermal collection unit and exhaust the air into the outer atmosphere. The venting ridge may include one or more extraction points for venting the air.

BRIEF DESCRIPTION OF THE DRAWINGS

The disclosure will become more fully understood from the following detailed description, taken in conjunction with the accompanying figures, wherein like reference numerals refer to like elements, in which:

FIGS. 35A-B are graphical representations of various performance statistics associated with different configurations of a solar thermal control system, according to one embodiment.

FIG. 39 is a schematic representation of a solar thermal control system, according to one embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, a solar thermal system is shown. Although the solar thermal system is shown as a roof installation throughout the Figures, the system may be mounted or coupled to any underlying support material (e.g., a wall, a roof, etc.) of a building or structure in order to collect solar energy at the structure. The solar thermal system may include a solar collector consisting of an outside cladding or external membrane (e.g., one or more roofing tiles) forming a cavity with the underlying support material of the building structure. The system is configured to collect heat from solar energy by extracting air from the cavity. The solar thermal system also includes a thermal collection unit (e.g., a thermal box) that may be mounted underneath the external membrane and connected to the cavity to collect and direct air flow from the cavity. The system may also include ducts (i.e., a ducting system) to direct the flow of air within the solar thermal system. The system described herein offers an additional benefit of providing building efficiency (e.g., energy efficiency) by way of reducing thermal load into the building or other associated structure during warm seasons and reducing the escape of thermal energy produced within the building or other structure during cold seasons.

Figure 1:
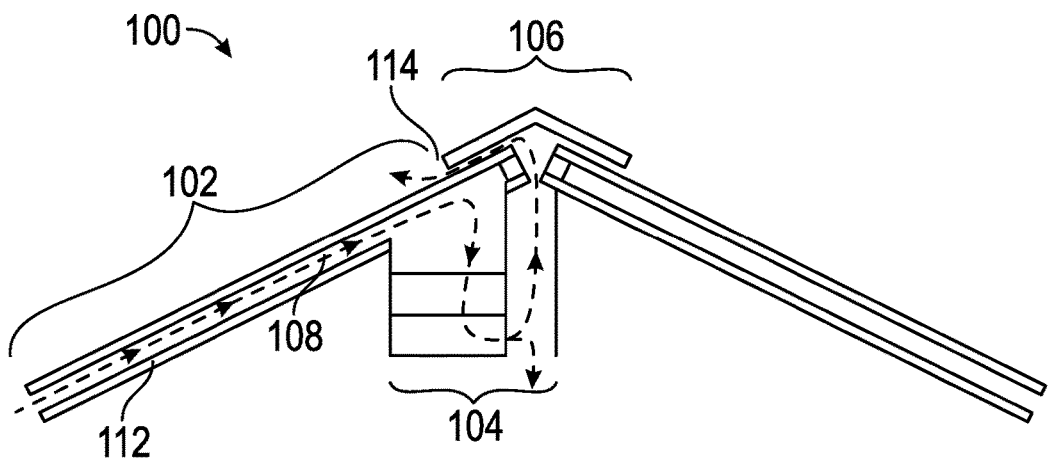
FIG. 1 is a schematic illustration of a solar thermal control system, according to an exemplary embodiment.

Referring to FIG. 1, a solar thermal control system 100 is shown, according to an exemplary embodiment. The system 100 may be configured to form an outermost (e.g., topmost) surface of a building or other structure. The system 100 includes a roofing membrane 102 configured to cover underlying support material 112 (e.g., building paper, plywood, drywall, etc.) of an associated building. The roofing membrane 102 may be at least partially made from a weatherproofing material in order to protect the structure from the elements, including the underlying material 112. The outermost surface of the roofing membrane 102 may be made from a material configured to absorb sunlight, such as a solar panel. In an exemplary embodiment, the roofing membrane 102 is made from a plurality of overlapping sections (e.g., tiles, shingles, etc.), as shown in at least FIGS. 2 through 4.

The roofing membrane 102 is configured to form a cavity 108 for air to flow between the membrane 102 and the underlying material 112. In an exemplary embodiment, the air within the cavity 108 is heated by the sunlight (i.e., the solar energy) captured by the roofing membrane 102. The hot air is drawn from the cavity 108 into a thermal collection unit shown as thermal box 104. An exemplary path for the hot air is illustrated by the arrows of FIG. 1. The thermal box 104 is fluidly connected to the cavity 108 and configured to receive the hot air from the cavity 108. The thermal box 104 and other similar thermal collection units are shown more particularly in FIGS. 5 through 9 and described in further detail below.

From the thermal collection unit 104, the air is either routed into the building (down according to FIG. 1) to be used to heat water or the environment within the building or the air is exhausted into the outside air via a vented ridge 106 of the system 100. Air may also be otherwise vented from the building in this or other embodiments (e.g., via a duct to an exterior wall such as a gable end). The vented ridge 106 is configured to cover a portion of the roofing membrane 102 and provides at least one extraction point shown as opening 114 for excess hot air to be exhausted from the system 100 (e.g., from the thermal box 104). The system 100 may include any number of extraction points (e.g., openings, exhaust areas, etc.) in other embodiments. The number of extraction points may depend on the size and/or shape of the roof or the associated building and/or a particular application of the thermal control system 100. In an exemplary embodiment, the number of extraction points is minimized in order to serve a particular function or application of the thermal control system 100. In one embodiment, for instance, the system 100 may include a single extraction point located centrally along the ridge line of the roof. The vented ridge 106 and its main components are shown more particularly in FIGS. 10 through 12 and described in further detail below.

Figure 2:
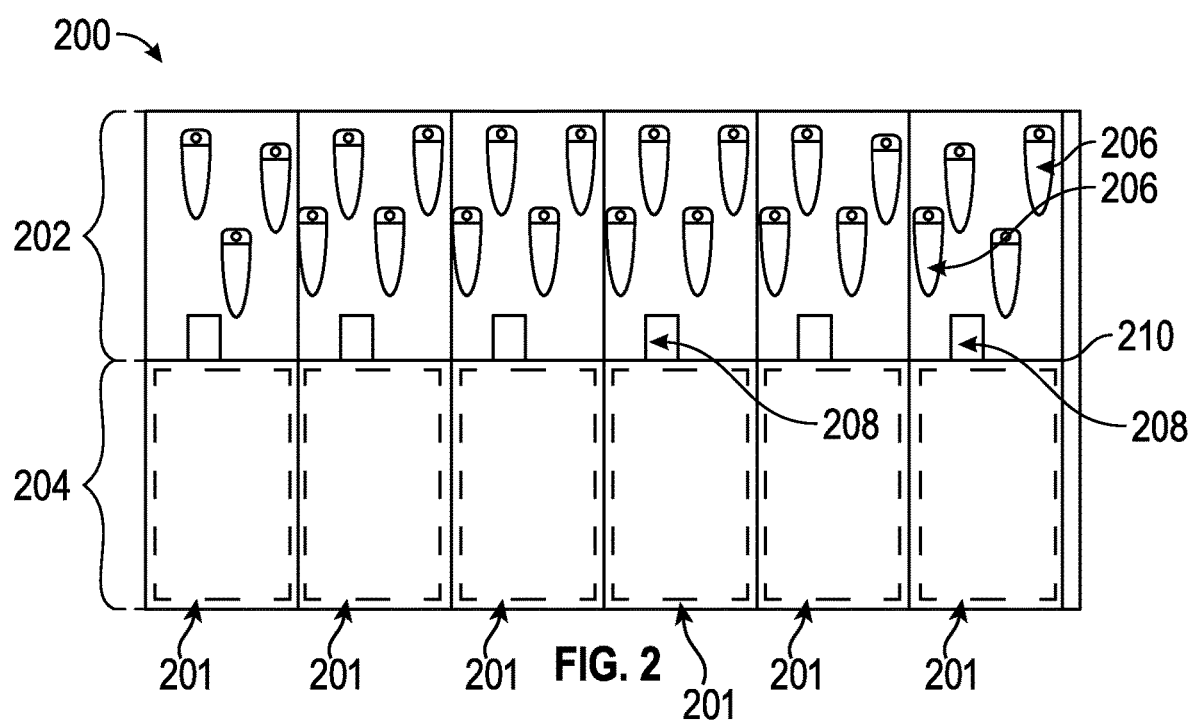
FIG. 2 is a bottom view of a roofing tile for the solar thermal control system, according to an exemplary embodiment.
Figure 3:
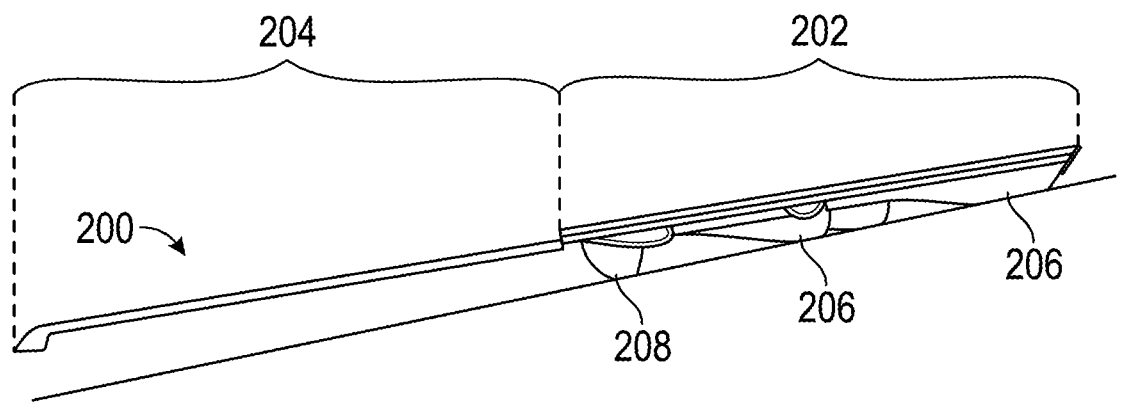
FIG. 3 is a side view of the roofing tile of FIG. 2.

Referring now to FIGS. 2 and 3, roofing tile 200 is shown, according to an exemplary embodiment. In this embodiment, two or more roofing tiles 200 may be combined (e.g., coupled, stacked, overlapped, etc.) to form the roofing membrane 102 or another similar outside cladding or covering for the system 100, as shown in FIG. 4. Each of the roofing tiles 200 includes an underlapping section 202 (e.g., bottom section, under section, etc.) and an overlapping section 204 (e.g., top section, over section, etc.). The sections 202 and 204 may be made from similar material. In an exemplary embodiment, the sections 202 and 204 have similar dimensions, including a similar area, such that the sections 202 and 204 overlap to form the membrane 102.

The underlapping section 202 includes feet 206 configured to rest on the underlying material 112 (or another outer surface) of the associated building, raising the remainder of the underlapping section 202 a distance above the underlying material 112. When the feet 206 rest on the underlying material 112, the cavity 108 is formed between the underlapping section 202 and the underlying material 112 (i.e., around or between the feet 206). The feet 206 may be shaped according to a desired or required cavity 108. For instance, the height of the feet 206 may be related to an intended air flow through the cavity 108, with a greater height leading to a greater air flow. The shape and size of the feet 206 may be optimized for ideal air flow. As an example, feet such as feet 206 may be placed to disturb laminar flow for maximum thermal harness of the air while traversing toward the collection unit (e.g., thermal box 104). The feet could be solid or hollow depending on the particular application and requirements of the feet and/or the system 100. The feet 206 may be shaped to minimize aerodynamic drag and enhance air flow around the feet 206 and through the cavity 108. For example, the feet 206 may have a rounded leading edge and may be approximately U-shaped. In an exemplary embodiment, the feet 206 are sized and shaped to provide an approximately twenty (20) millimeter air gap between the roofing tile 200 and the underlying material 112 (e.g., wherein the feet 206 and/or the cavity have a height of approximately twenty millimeters). The air gap (e.g., the cavity 108) is intended to allow air to be drawn from either a section (e.g., a roofing tile 200) or the whole roof (e.g., the membrane 102) to a centrally located thermal collection unit (e.g., thermal box 104). However, the roof of a building structure may contain a plurality of collection units to optimize thermal energy harvest. For example, in one embodiment solar thermal energy may be collected from a first roof surface and directed (e.g., via a system of ducts and dampers) to a second roof surface to melt snow on the second roof surface. In another embodiment, a first roof surface or section of roof surfaces may be utilized for water heating and a second roof surfaces or section of roof surfaces may be utilized for space heating.

The underlapping section 202 may include any number of feet 206 as is suitable for the particular application of the system 100. For instance, the underlapping section 202 may include less feet 206 if a greater air flow is required through the cavity 108 (i.e., to create more air space within the cavity 108). The underlapping section 202 may also include more feet 206 if the roofing tiles 200 are made from a particularly heavy material (i.e., to support the weight of the tiles 200) or are to be positioned in a relatively high foot-traffic area of the roof (e.g., to support the weight of any service personnel or other persons on the roof). The feet 206 may be approximately equally spaced across the underlapping section 202 in order to raise the underlapping section 202 an appropriate distance above the underlying material 112 and create the cavity 108.

The underlapping section 202 also includes fixing points 208 located near a dividing line 210 between the sections 202 and 204. The fixing points 208 may provide attachment points for attaching the roofing tiles 200 to a thermal collection unit such as thermal box 104. The fixing points 208 may be sized and located on the underlapping section 202 relative to one or more features of the associated thermal collection unit 104, such as to fix the tile 200 to the unit 104. The fixing points 208 are discussed in further detail below in reference to the thermal collection units (see FIGS. 5 through 9).

Figure 4A:
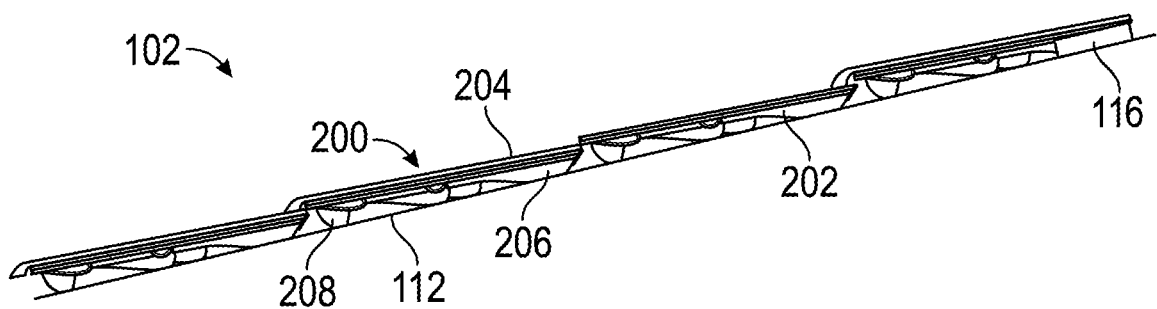
FIG. 4A is a side view of a series of overlapping roofing tiles, according to an exemplary embodiment.
Figure 4B:
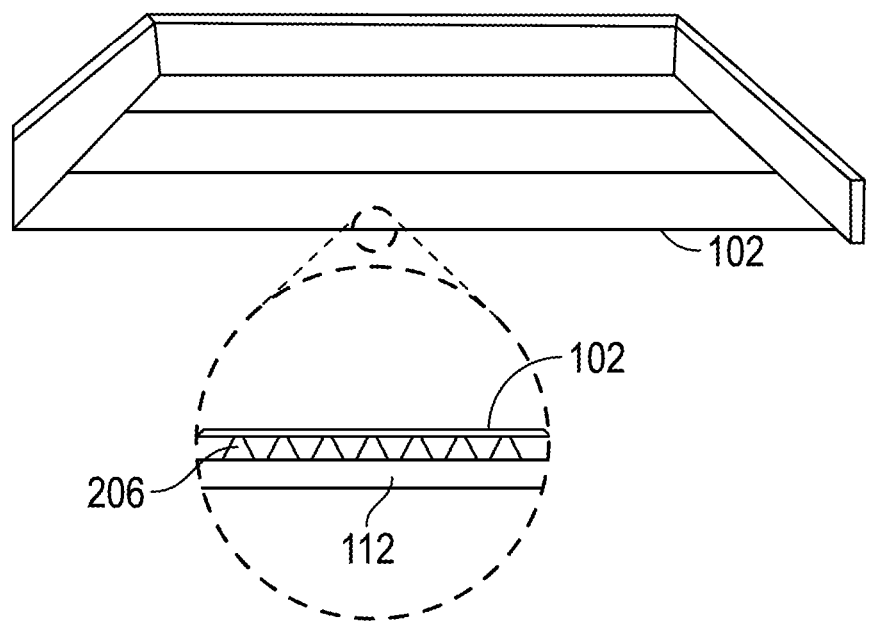
FIG. 4B is a front perspective view of overlapping roofing tiles for a flat roof membrane, according to another embodiment.

Referring now to FIGS. 4A and 4B, the roofing membrane 102 is shown, according to an exemplary embodiment. The roofing membrane 102 may be configured for a slanted or angled roof (FIG. 4A) or a substantially flat roof (FIG. 4B). In the embodiment of FIG. 4A, the roofing membrane 102 is formed from a plurality of overlapping roofing tiles 200. An overlapping section 204 of each of the tiles 200 covers an underlapping section 202 of an adjacent tile. In one embodiment, the sections 202 and 204 of the tiles 200 may be coupled to each other in order to stabilize the roofing membrane 102. For instance, each of the sections 202 and 204 may include corresponding locking assemblies configured to interlock with each other to couple the tiles 200. Furthermore, the locking assemblies may be configured to optimize thermal transfer between a superstrate surface and a substrate surface.

The roofing membrane 102 includes a seal 116 in this embodiment. The seal 116 is configured to seal the cavity 108 (i.e., space between the roofing membrane 102 and the underlying material 112) in the area of the seal 116. In an exemplary embodiment, the seal 116 is installed underneath the roofing membrane 102 at the highest point of the roof in order to aid in the directing and collection of the air within the cavity 108 (e.g., on a slanted roof such as the roof of FIG. 4A). In other embodiments, the system 100 may include other seals similar to seal 402 in order to seal air within the system 100 (e.g., within the cavity 108), including flashings configured to maintain a seal that prevents or greatly reduces both air and debris and moisture infiltration. Additionally, filters could be installed so as to prevent debris and moisture infiltration whilst allowing air to pass through (e.g., underneath a starter course of tiles).

Figure 5:
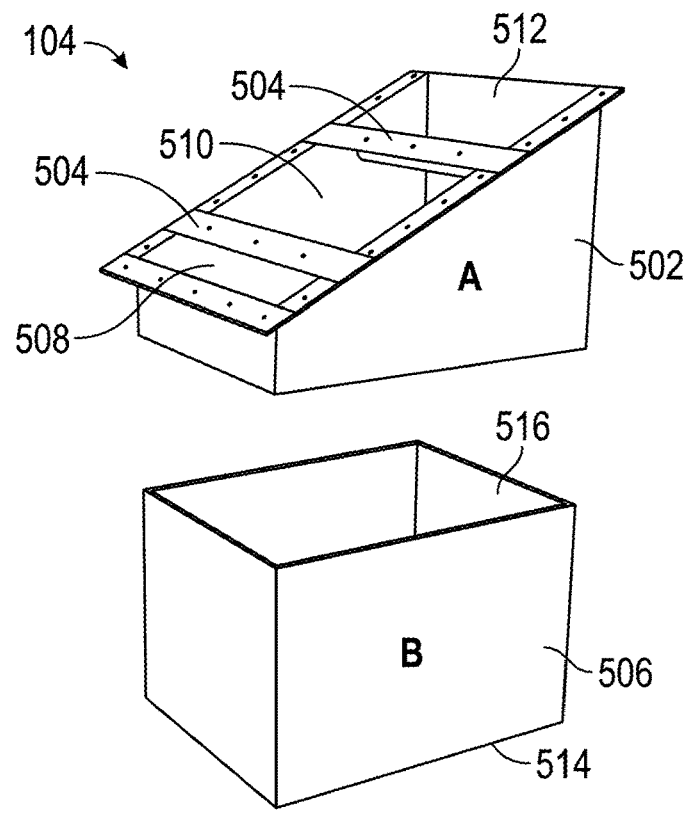
FIG. 5 is an isometric view of a thermal collection unit for the solar thermal control system, according to an exemplary embodiment.

Referring now to FIG. 5, thermal collection unit 104 is shown, according to an exemplary embodiment. The thermal collection unit 104 is configured to fluidly connect to the cavity 108 in order to collect air (e.g., heated air) directed from the cavity 108. The air may be diverted from the thermal collection unit 104 to heat water used within an associated building or to otherwise provide heat or other energy to the building environment (e.g., raise the ambient temperature within the building). In another embodiment, the thermal collection unit 104 removes heat, and consequently humidity (e.g., moisture), from the air. The dehumidified, cooled exhaust air may then be used to cool the habitable space of the associated building. The removed heat can be transferred to a body of water (e.g., tank, pool, spa, etc.) or other fluid or medium. The thermal collection unit 104 may be installed from the outside of an associated building. The thermal collection unit 104 is typically installed prior to attaching or installing the roofing membrane 102. For instance, an opening may be formed within the roof of the building (e.g., through the underlying material 112) that is sized to fit the thermal collection unit 104. The opening may be formed by cutting a hole in the underlying material 112. The thermal collection unit 104 may be placed within the opening and covered by the roofing membrane 102 to seal the opening. Although the thermal collection unit 104 is particularly configured to be installed within the illustrated roof and receive air from the cavity 108 formed by the roofing tiles 200, the unit 104 may also be used with any similar thermal control system that provides a similar cavity on the underside, including corrugated iron and terracotta tiles.

In the illustrated embodiment of FIG. 5, the thermal collection unit 104 includes a hood 502 having ribs 504 and a base 506 from which the air is ducted. The hood 502 may be required to approximately match a pitch (e.g., slope, angle, steepness, etc.) of the roof of the building when the thermal collection unit 104 is installed. The hood 502 is configured to couple with the base 506 to form the thermal collection unit 104. The ribs 504 may be added to the hood 502 after the thermal collection unit 104 is installed to the building. The ribs 504 may provide fixing points for the roofing tiles 200. For instance, the fixing points 208 of one of the tiles 200 may be affixed or otherwise coupled to the ribs 504 in order to couple the tile 200 to the unit 104, which may stabilize the tile 200 and/or the unit 104. In one embodiment, the seal 116 is configured to couple to one of the ribs 504 on a first end and couple to the roofing membrane 102 on a second end in order to form an approximately airtight seal between the membrane 102 and the thermal collection unit 104. In another embodiment, a flexible, accordion-like material may be used to adapt to and seal a variety of roof pitches.

The hood 502 also includes openings 508, 510, and 512 positioned between the ribs 504 at a top portion of the thermal collection unit 104. The openings 508, 510, and 512 may be configured to receive air from the cavity 108 and/or to divert or exhaust air outside of the building through an extraction point at the vented ridge 106. In other embodiments, the hood 502 may include more or less openings and the openings may be otherwise configured according to the particular application of the solar thermal control system 100 and/or the thermal collection unit 104. For instance, the openings may be sized and located according to the energy and venting requirements of a particular building. In an exemplary embodiment, the thermal collection unit 104 is configured to collect or receive air through the openings 508 and 510 and send air to the vented ridge 106 through the opening 512. In another embodiment, air is exhausted to lower portions of the roof under the membrane 102 to form a closed system. Such an embodiment may be preferred in colder climates (e.g., regions further away from the equator, higher altitude environments, etc.). Once received within the hood 502, air may be diverted into the building through the base 506. A top opening 516 of the base 506 is configured to receive air from the hood 502 and the air may be diverted into the associated building through a bottom opening 514 of the base 506.

Figure 6:
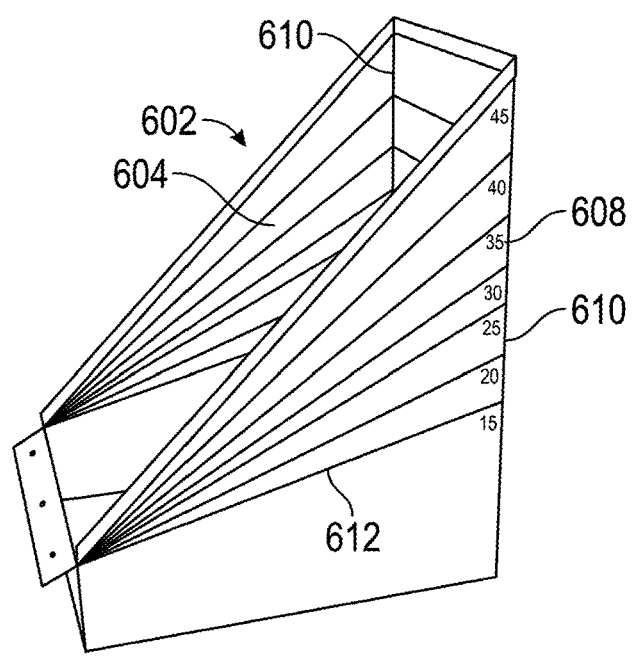
FIG. 6 is an isometric view of a hood for a thermal collection unit, according to an exemplary embodiment.
Figure 7:
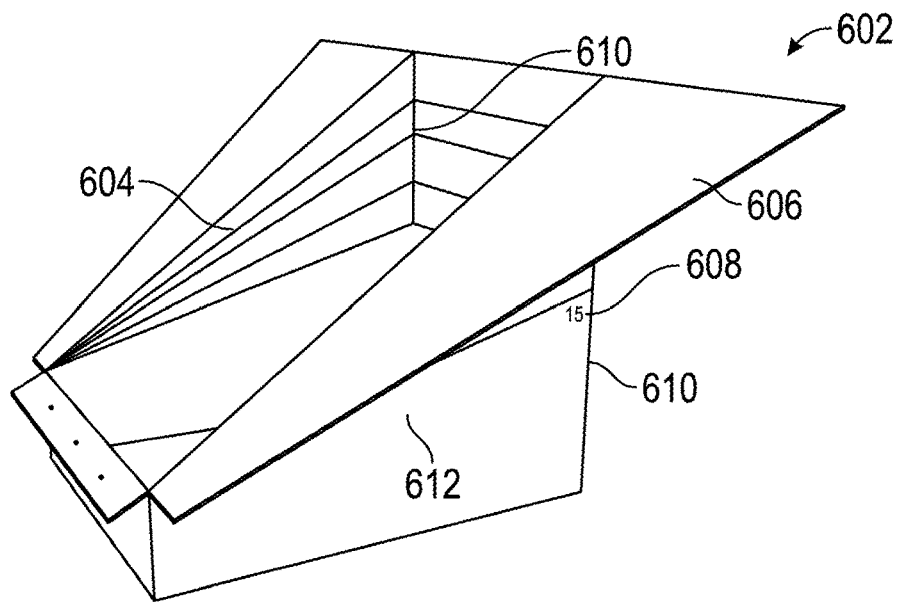
FIG. 7 is an isometric view of the hood in a modified configuration, according to an exemplary embodiment.

To install the thermal collection unit 104 into a building, a hole may be cut in the underlying material 112 in the approximate shape of the unit 104 (e.g., according to one or more dimensions of the unit 104). The unit 104 may then be installed at the site of the opening. The unit 104 may include one or more features configured to attach or otherwise couple the unit 104 to the underlying material 112. Referring now to FIGS. 6 and 7, a hood 602 is shown for the thermal collection unit 104. The hood 602 may be similar to hood 502 and may include any features or functions described in reference to the hood 502. FIG. 6 shows the hood 602 in a pre-modified (e.g., non-flanged) configuration. FIG. 7 shows the hood 602 in a modified (e.g., flanged) configuration that may be useful in installing the hood 602 into the building.

As shown in FIG. 6, the hood 602 includes excess material 604 that may be bent to create flanges 606 (see FIG. 7) for fixing the thermal collection unit 104 to the roof of a building. The excess material 604 includes a series of markings 608 to aid in creating the flanges 606. For instance, each of the markings 608 may correspond to a specific pitch for the roof, such as pitches that may be standard or typical. As shown in FIG. 7, the excess material 604 may be bent and/or cut to form the flanges 606. For instance, the excess material 604 may be cut along back corners 610 of the hood 602 and sides 612 may be bent to approximate the configuration of FIG. 7. Once the hood 602 has been modified for the roof pitch, the hood 602 may be connected to the base (e.g., base 506) and the complete thermal collection unit 104 is inserted into the roof (e.g., through the hole in the underlying material 112). The flanges 606 may then be attached to the roof of the associated building (e.g., to contact the underlying material 112) in order to hold or fix the thermal collection unit 104 in place. The ribs 504 may then be installed and the unit 104 may be covered by the roofing membrane 102. Alternatively, a flexible material (e.g., accordion style) may be used to automatically adjust to roof pitch while maintaining a proper seal.

Figure 8:
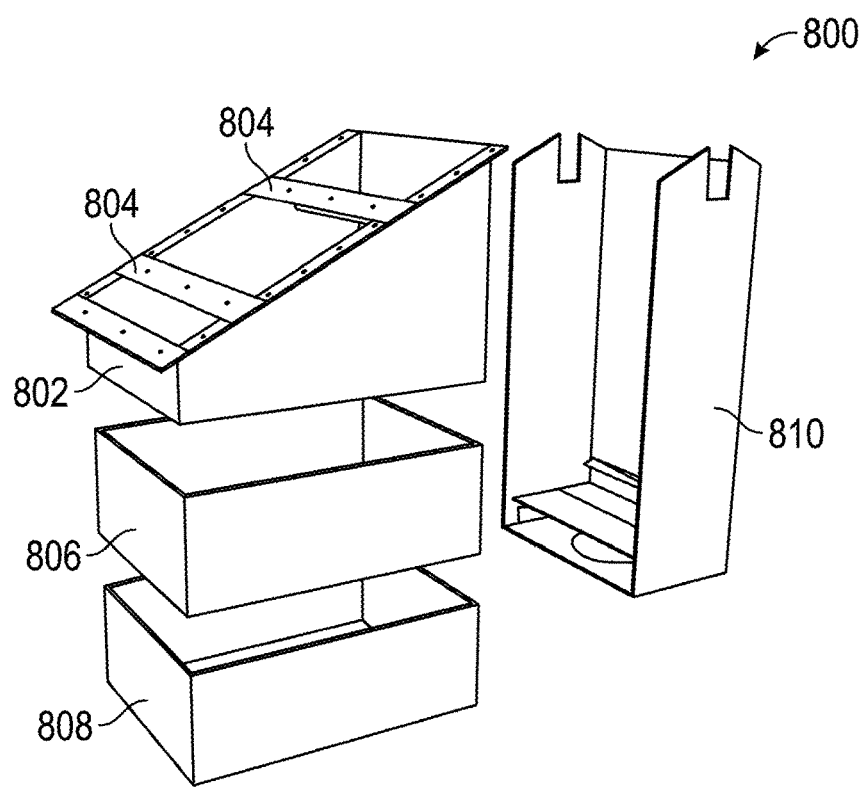
FIG. 8 is an exploded view of a thermal collection unit having additional functional modules, according to an exemplary embodiment.
Figure 9:
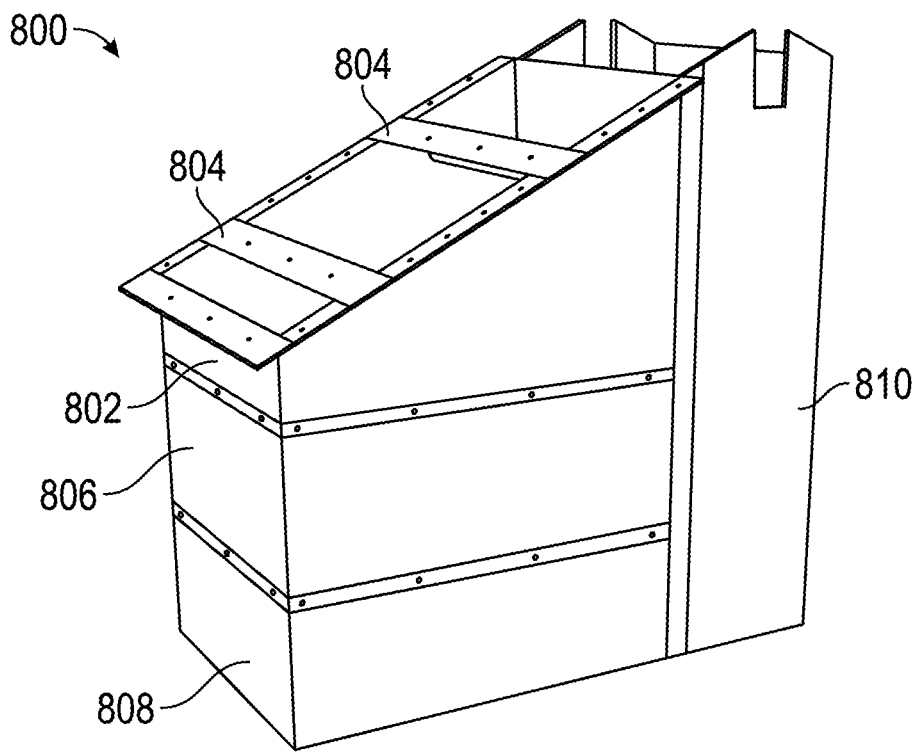
FIG. 9 is an isometric view of the thermal collection unit of FIG. 8.

Referring now to FIGS. 8 and 9, another thermal collection unit 800 is shown, according to one embodiment. The unit 800 is similar to the unit 104, but has been modified to include additional features and/or functionality. In this embodiment, the unit 800 includes a hood 802 having ribs 804, which are similar to the hood 502 and ribs 504 of the thermal collection unit 104. The thermal collection unit 800 also includes a heat exchange module 806 which couples to the bottom of the hood 802 in a manner similar to the base 506 of the unit 104. The heat exchange module 806 is configured to receive air from the hood 802. For clarity, the heat exchange module 806 is a module that transfers thermal energy or heat from a medium contained in one component or section to a medium contained in another component or section and may include components such as a heat exchanger, an evaporator (e.g., a heat pump), a heat sink, and other components suitable for the particular application of the system 100. The flow of energy may be unidirectional, multidirectional, and/or reversible. A fan module 808 is configured to couple to a bottom portion of the heat exchange module 806. The fan module 808 may include a fan configured to drive the airflow received from the cavity 108 into the building. The fan may also be configured to drive the airflow in the opposite direction, such as back through the hood 802 and through an extraction point of the vented ridge 106. The unit 800 also includes a ducting module 810 configured to couple to a back portion of the hood 802, the exchange module 806, and the fan module 808. The ducting module 810 is configured to sit beneath the vented ridge 106 and direct or allow excess air to be exhausted or vented through one or more extraction points of the vented ridge 106.

Figure 10:
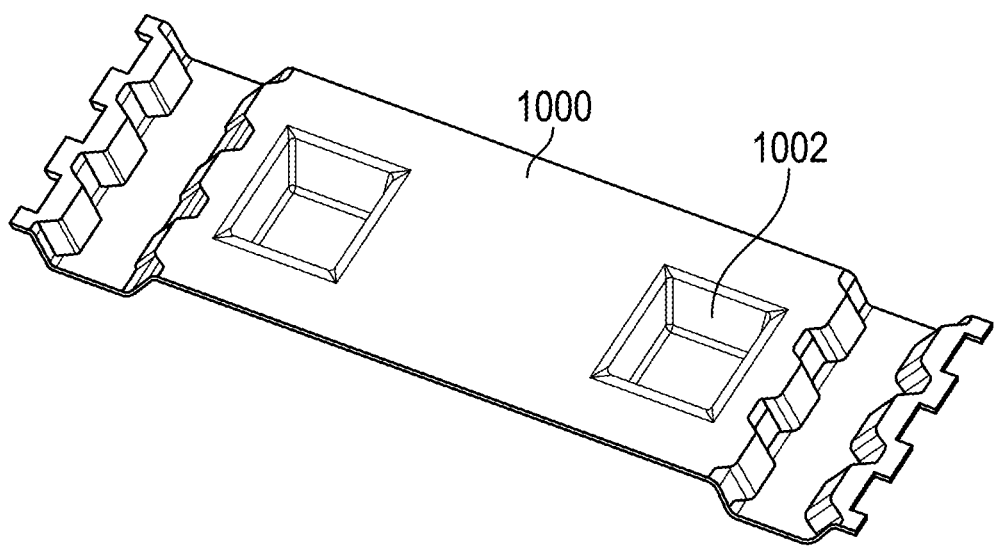
FIG. 10 is a perspective view of a ridge clip for a venting ridge of the solar thermal control system, according to an exemplary embodiment.
Figure 11:
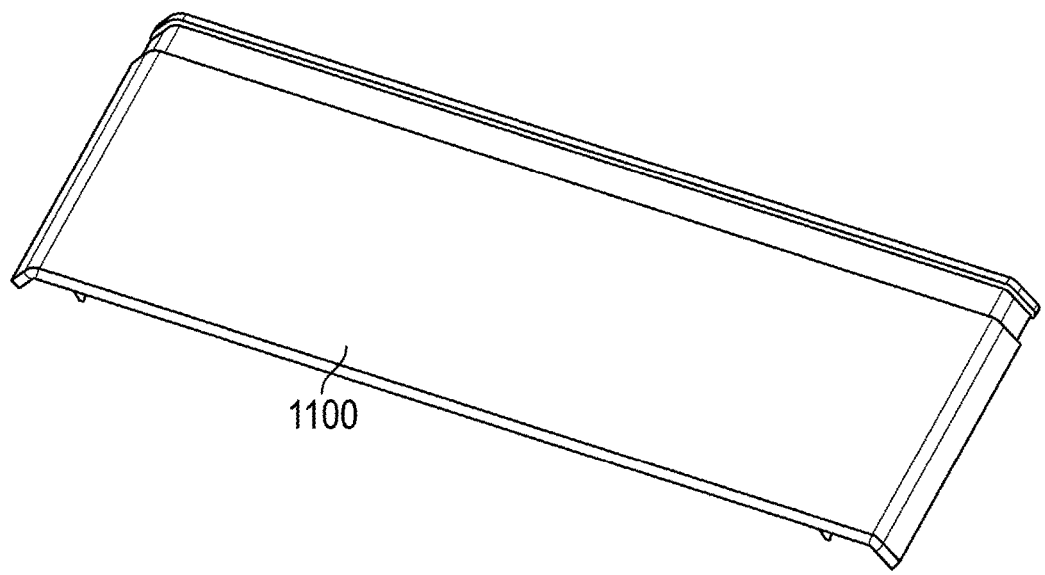
FIG. 11 is a perspective view of a ridge tile for the venting ridge, according to an exemplary embodiment.
Figure 12:
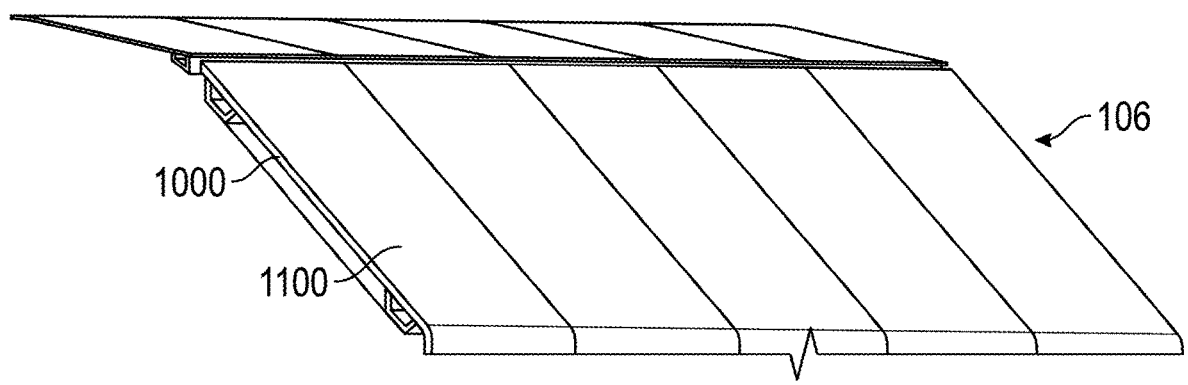
FIG. 12 is a perspective view of the venting ridge, according to an exemplary embodiment.

Referring now to FIGS. 10 through 12, the vented ridge 106 is shown, according to an exemplary embodiment. The ridge 106 may be coupled to the roofing membrane 102 and is configured to seal (e.g., weather seal) the solar thermal control system 100. The ridge 106 is also configured to exhaust, or vent, air received from the ceiling space of the building and accommodate any exhaust received from a thermal collection unit. The ridge 106 includes a ridge clip 1000 which may be fixed to the top of the ridge 106 and is configured to receive a ridge tile 1100. The vented ridge 106 may also include a filter which is configured to filter air exhausted from the system 100 into the outside atmosphere. The filter may fit within a slot 1002 of the ridge clip 1000.

Figure 13:
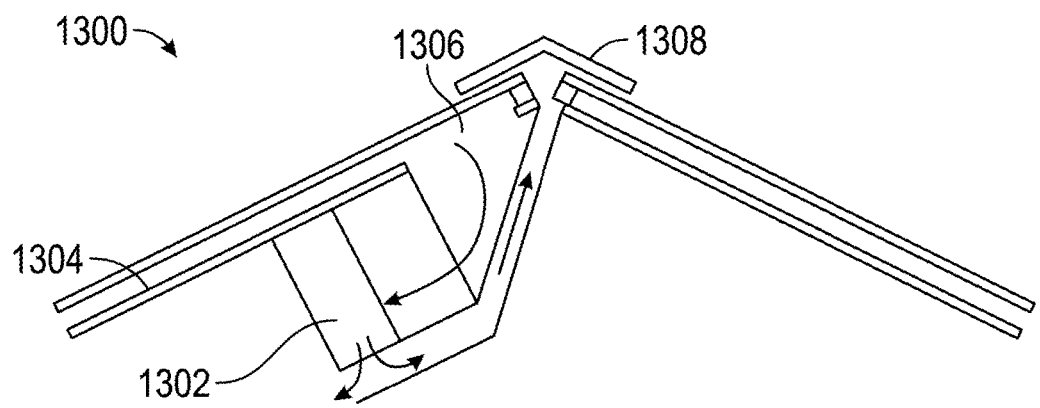
FIG. 13 is a schematic illustration of a solar thermal control system, according to one embodiment.
Figure 14:
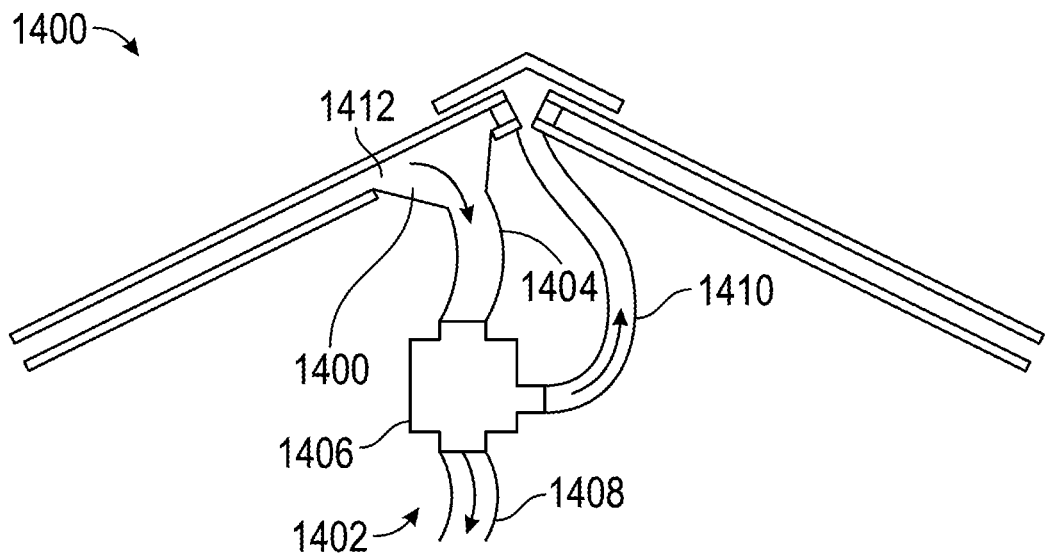
FIG. 14 is a schematic illustration of a solar thermal control system having a flexible ducting system, according to one embodiment.
Figure 15:
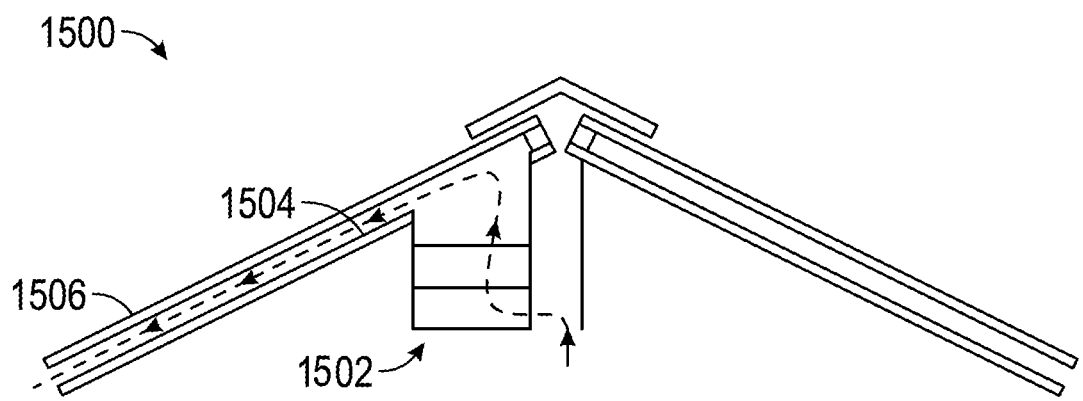
FIG. 15 is a schematic illustration of a solar thermal control system having a reverse air flow, according to one embodiment.

Referring now to FIGS. 13-15, solar thermal control systems are shown, according to other embodiments. System 1300 of FIG. 13 includes a thermal collection unit 1302 in an alternate configuration. In this configuration, the thermal collection unit 1302 is coupled to a ceiling portion 1304 of the building. The air is directed sideways from a cavity 1306 beneath the roof membrane rather than down into the building. The air is then directed into the building or toward a vented ridge 1308 to be exhausted into the outer atmosphere. System 1400 of FIG. 14 includes a thermal collection unit shown as flexible ducting system 1402. The flexible ducting system 1402 includes a first duct 1404 configured to route air from a cavity 1412 beneath the roof into a routing unit 1406. From the routing unit 1406, air is either routed to duct 1408 to be used to heat the building environment or into duct 1410 to be exhausted into the outside atmosphere. System 1500 of FIG. 15 has a reversed direction of air flow. For instance, in locations in which there is snowfall, heated air may be routed from the building, up through a thermal collection unit 1502 and to a cavity 1504 underneath a roofing membrane 1506 in order to assist in melting snow and/or ice on the roof of the building.

Figure 16:
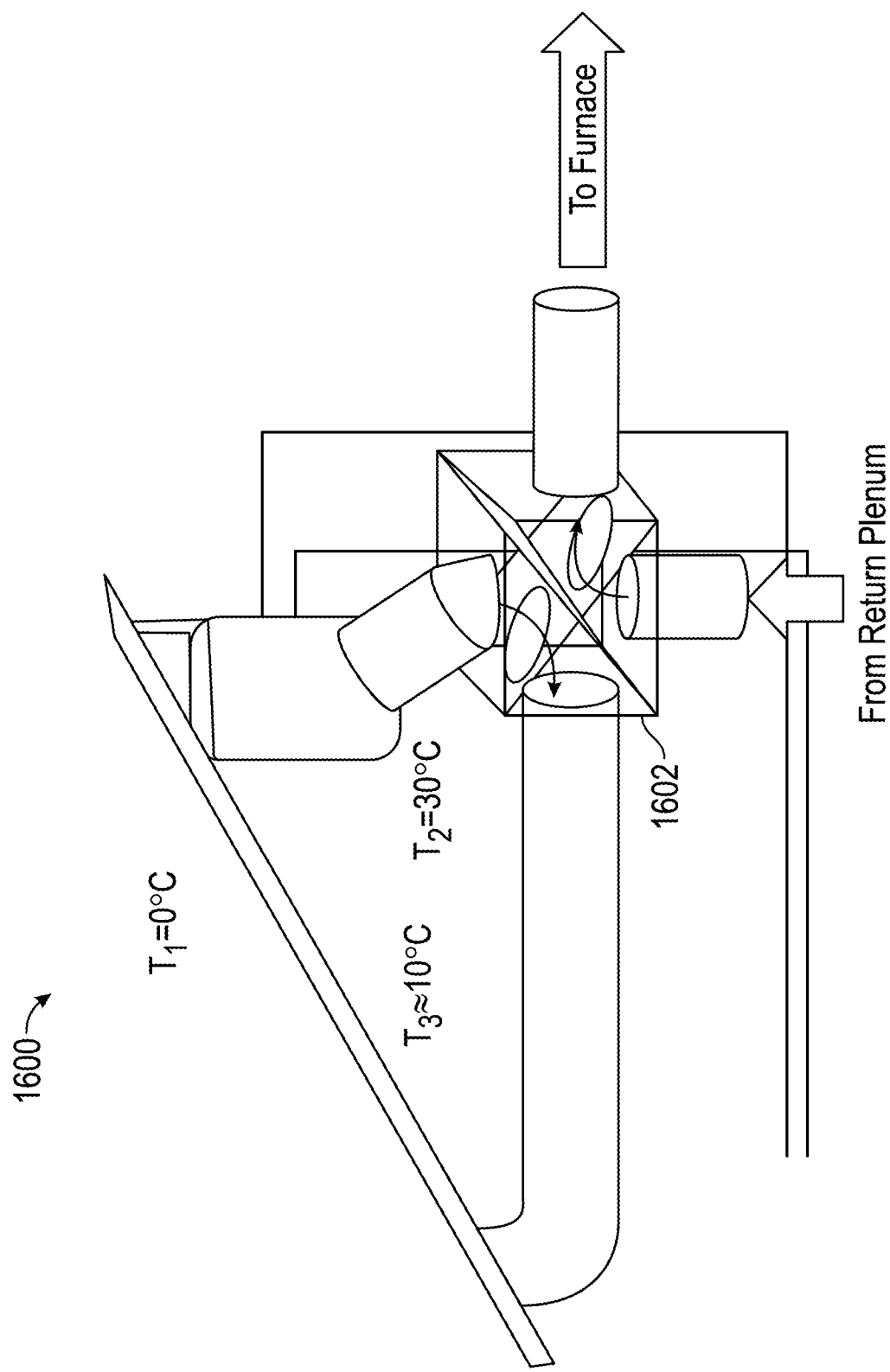
FIG. 16 is a schematic illustration of another solar thermal control system having a reverse air flow, according to one embodiment.

Referring now to FIG. 16, a closed loop configuration system 1600 for a snow/ice melt system is shown, according to one embodiment. The system 1600 may be similar to any of the thermal exchange systems described herein. In this embodiment (i.e., system 1600), heat exchange module 1602 (i.e., thermal collection unit) may operate or function "in reverse" in order to transfer heat from a heat-generating or heat storage element (e.g., a hot water tank) to the air passing through the closed loop. In one embodiment, an associated water pump is reversed to circulate the hottest liquid through the heat exchange module 1602 to heat the air in order to melt snow/ice. The heated air is exhausted from the heat exchange module 1602 into a space between the roof deck and a roof membrane (e.g., cavity 1504) in order to melt snow/ice on the roof. The hottest air is exhausted at the lowest points (e.g., eaves, valleys, etc.) and drawn up or across the roof via a fan of the thermal collection unit (e.g., module 1602). The air may then be reheated on its way back through the system 1600.

Figure 17:
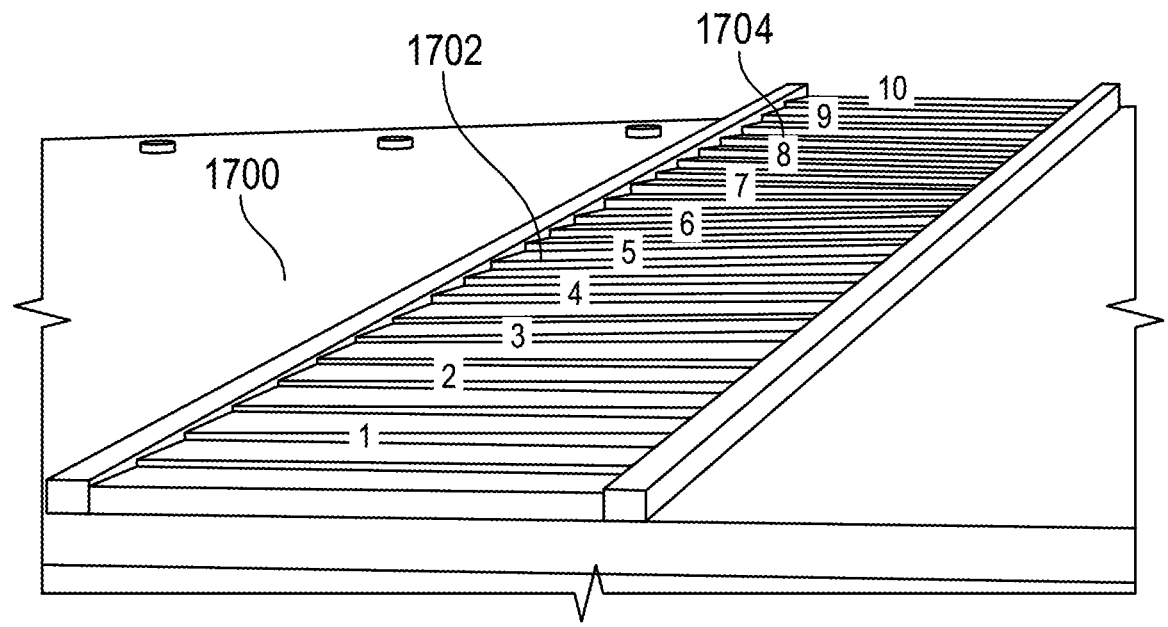
FIG. 17 is an illustration of a first roofing tile test environment.
Figure 18:
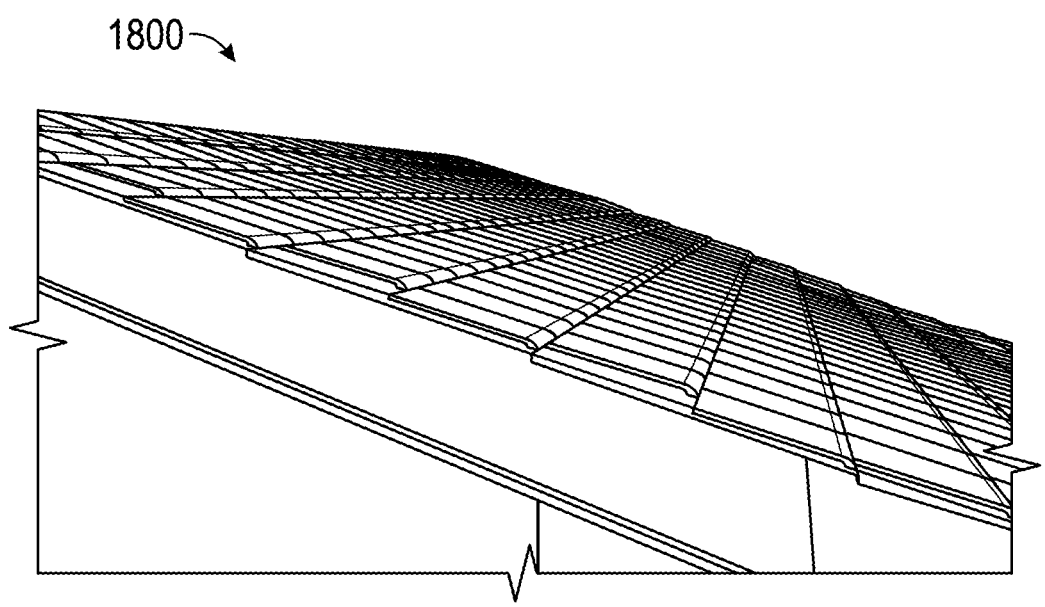
FIG. 18 is an illustration of a second roofing tile test environment.

Referring now to FIGS. 17 and 18, example roofing environments are shown. Described below are the results of measurements that were performed on each of the roofing environments, shown separately in FIGS. 17 and 18, respectively. FIG. 17 shows a rooftop 1700 having a five meters squared column of 900 mm roofing tiles 1702. The roofing tiles 1702 may be similar to tiles 200. Shown in FIG. 18 is a 4 meter×3.5 meter single sided roof 1800. FIGS. 17 and 18 also indicate the placement of various (numbered) temperature sensors 1704 under and on top of the roofs 1700 and 1800. In the instances of FIGS. 17 and 18, the temperature was measured both before air enters the heat exchanger of the thermal box (e.g. unit 104), such as at an air inlet, and after the air exits the heat exchanger (e.g., at an air outlet).

Figure 19:
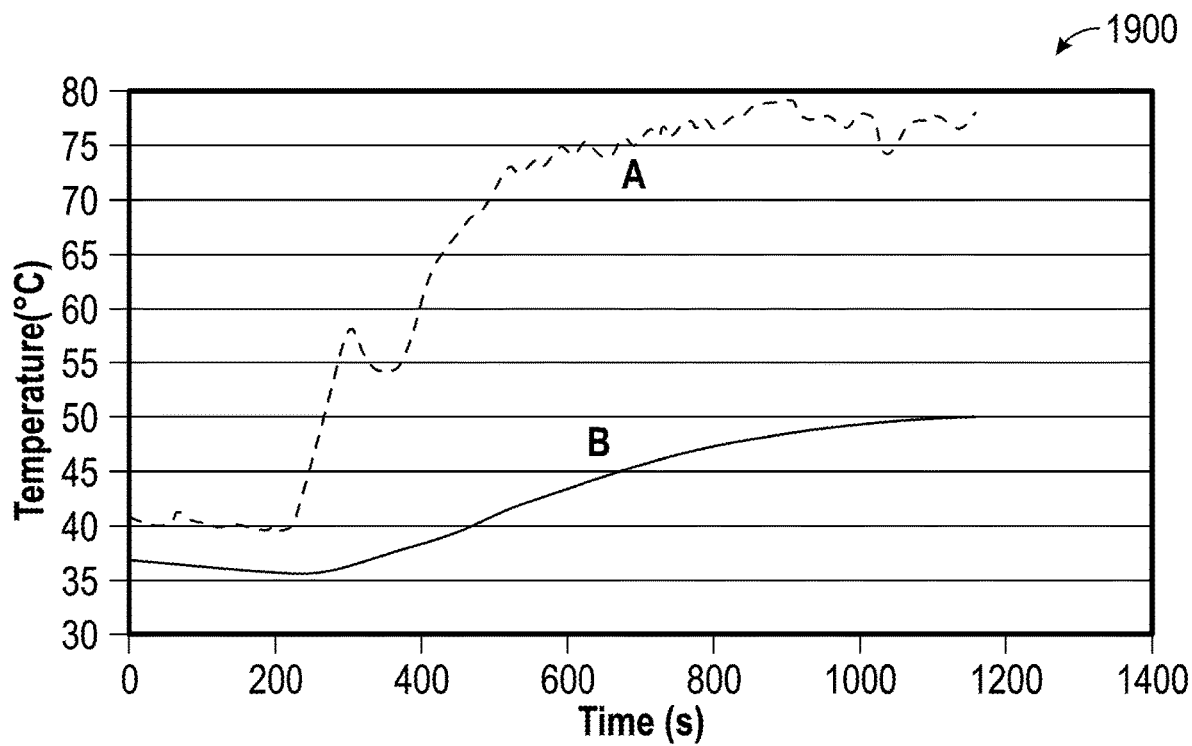
FIG. 19 is a graphical representation of temperatures on a cloudless day measured at both roofing tile test environments, according to one embodiment.

Referring now to FIG. 19, graph 1900 shows the correlation between (A) the temperature on the surface of the roofing tiles 1702 at the apex of the roof 1700 (roof tiles of FIG. 17) and (B) the air temperature at the intake section of the thermal box (rooftop 1800 of FIG. 18). The results depicted in graph 1900 were obtained on a clear summer day in Auckland, NZ, with an ambient temperature of 26 degrees Celsius and using a flow rate of approximately 100 cubic meters per hour.

Figure 20:
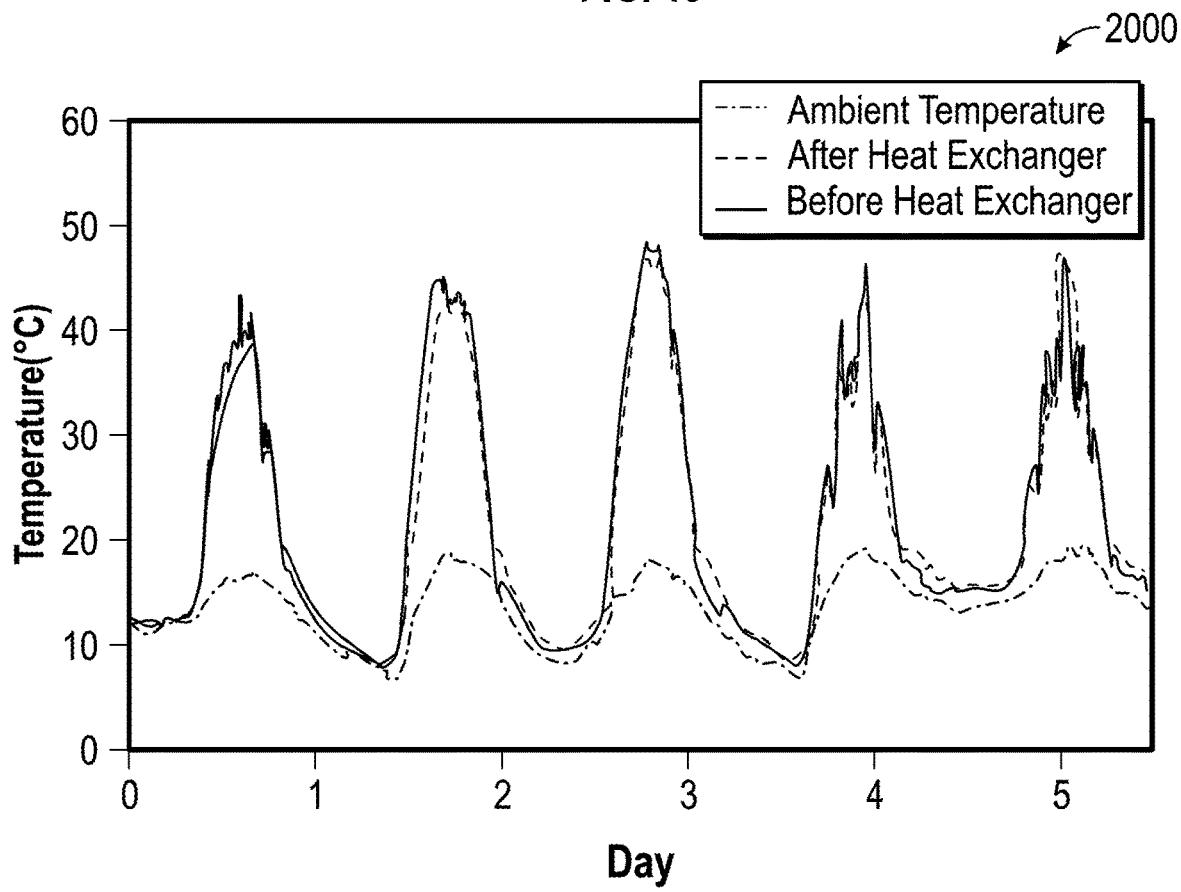
FIG. 20 is a graphical representation of a correlation between temperature before and after a heat exchanger over 5 days, according to one embodiment.

Referring now to FIG. 20, graph 2000 shows a correlation between the temperature before the heat exchanger (e.g., at an air inlet) and after the heat exchanger (e.g., at an air outlet) with the ambient air temperature for five days in winter in Auckland, NZ. These results were obtained using a flow rate of approximately 252 cubic meters per hour.

Figure 21:
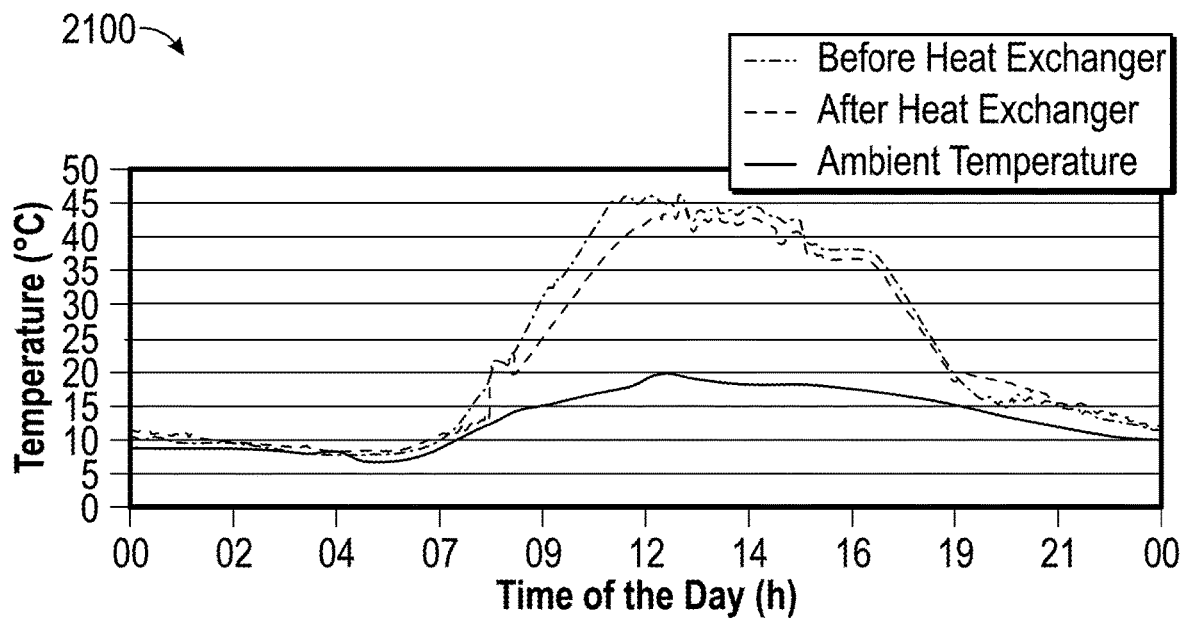
FIG. 21 is a graphical representation of temperature before and after a heat exchanger with ambient air, according to one embodiment.
Figure 22:
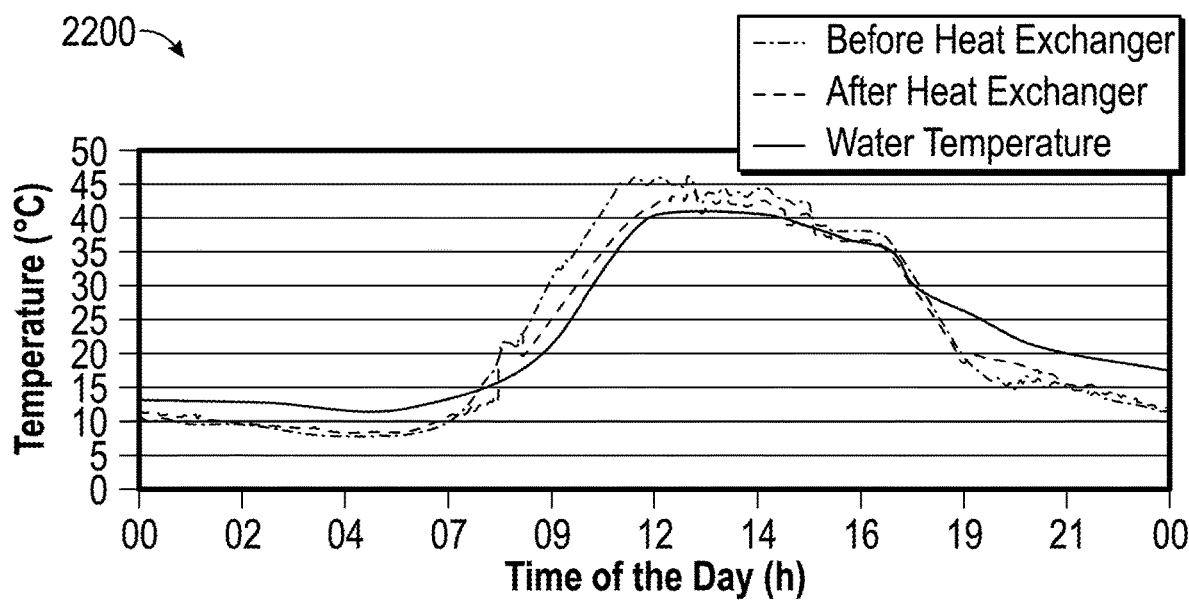
FIG. 22 is a graphical representation of temperature before and after a heat exchanger with a hot water cylinder connected to a heat exchanger, according to one embodiment.

Referring now to FIGS. 21 and 22, graph 2100 and 2200 show a correlation for a single day between (A) the temperature before and after the heat exchanger with the ambient air (shown at graph 2100) and (B) the temperature before and after the heat exchanger with a 45 liter hot water cylinder connected to the heat exchanger (shown at graph 2200). These results were obtained using a flow rate of approximately 252 cubic meters per hour. According to the conditions associated with graph 2100, a fan turns on when the air temperature is above 20° C.

Figures 23, 24:
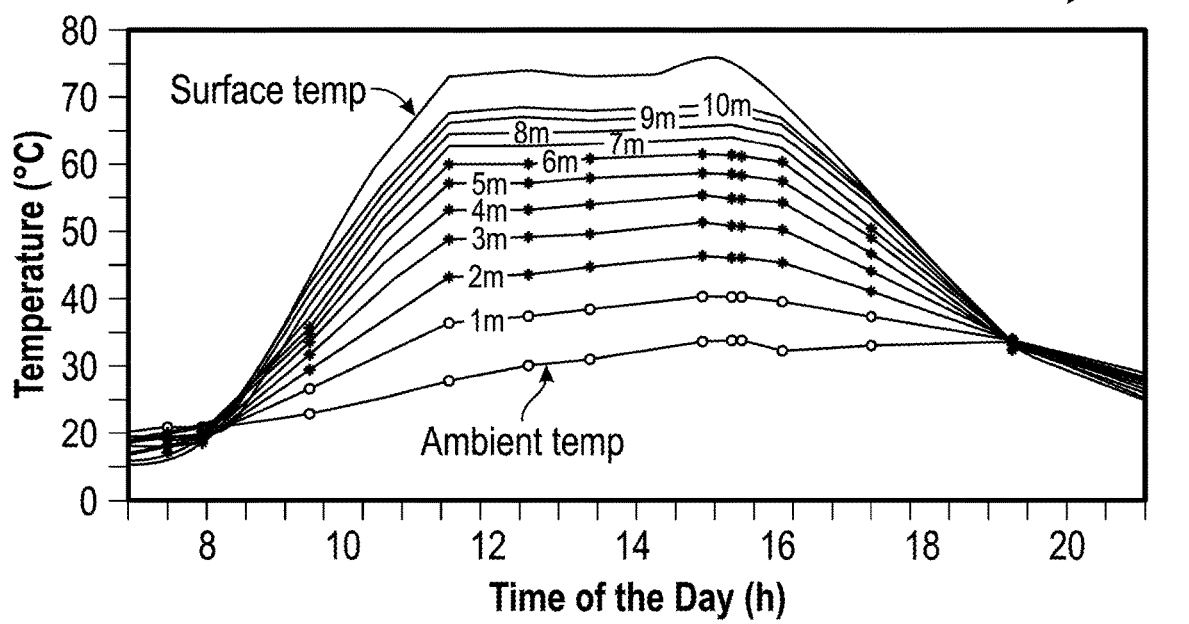
FIG. 23 is a table showing calculated energy and efficiency over a period of days, according to one embodiment.
FIG. 24 is a graphical representation of roof cavity air temperature for different roof spans, according to one embodiment.

Referring now to FIG. 23, table 2300 shows the calculated energy and efficiency collected for consecutive winter days in Auckland, NZ. The roofing tile includes a solar cell 201 into the laminated tiles/structure, and the correlation between the operating temperature and cell efficiency is well established. In order to determine the cooling effect of the top surface of the roofing tile (e.g., tile 200) by the air flow within the cavity, a series of experiments were carried out which showed that a drop in temperature of 6 degrees Celsius was achieved at a flow rate of approximately 1.4 meters per second when compared to the static system. In parallel to the real time measurements, a series of simulations were performed. An object oriented simulation tool was used to estimate the effect of roof length on the temperature gradient of the air.

Referring now to FIG. 24, graph 2400 shows the results of a simulation used to estimate the effect of roof length on the temperature gradient of the air. The results predict the shape of the temperature gradient within the roof cavity for a given day. The simulation was conducted with different roof cavity air temperatures for different roof spans, with an air velocity of approximately 1 meter per second. The results indicate that at the given flow rate (1 meter per second) the longer the roof the greater the heating along its path through the cavity. This relationship, however, will reach an optimal point beyond which further heat gains become minimal (e.g., approach an asymptote limiting the heat transfer rate), and at which point an increased flow rate must be used.

Figure 25:
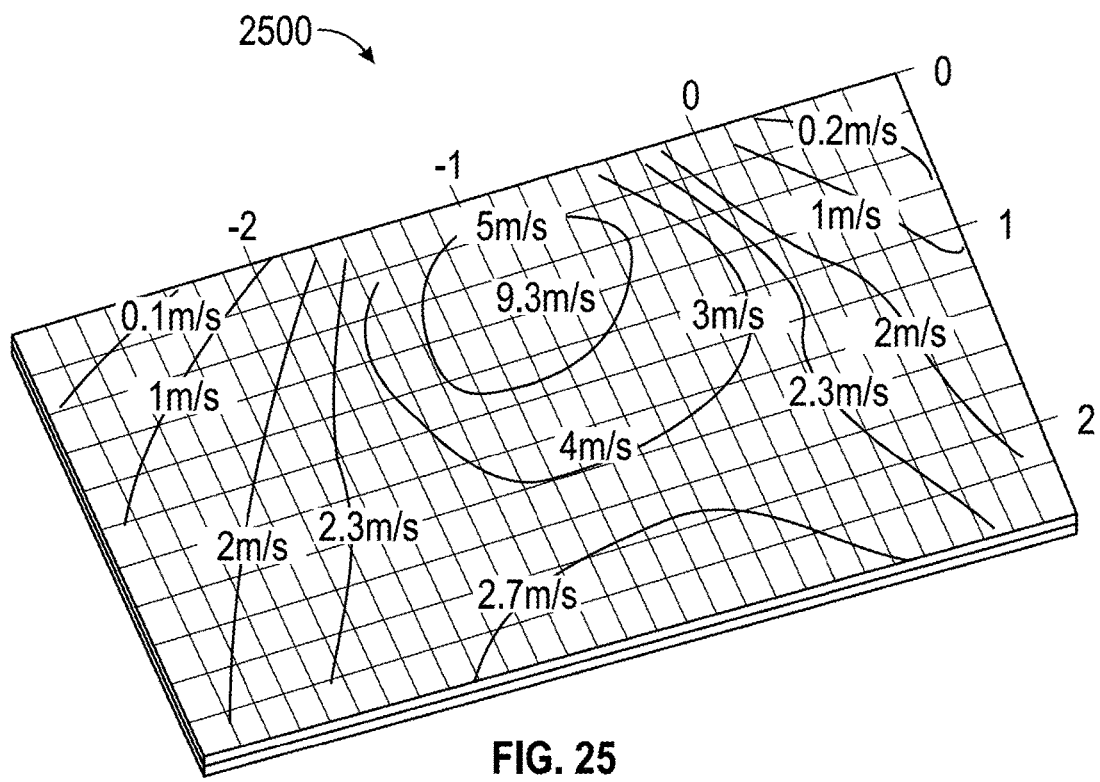
FIG. 25 is a graphical representation of air flow through a roof cavity, according to one embodiment.

Referring now to FIG. 25, a fluid dynamics simulation tool was used to simulate the air flow through the roof cavity. A simplified model 2500 of the tile feet was constructed in the software, and an approximately 4 meter×2 meter chamber was created with the tiles on the top. The experimental conditions included a pressure of zero (0) Pascal for the inlet air and an air speed of two (2) meters per second for a single outlet at the top center of the chamber, in an attempt to simulate the set up in a solar thermal collector of the present disclosure. The results showed that there is a bell shaped temperature profile created by the air flow, and at the boundary close to the outlet the speed is higher than at the top edges. When the vertical distance from the outlet is increased, the air flow is balanced. The balance is acceptable at two (2) meters from the top. The results were compared with an experimental roof of dimensions 4 meters×4 meters, which showed a similar profile.

Figure 26:
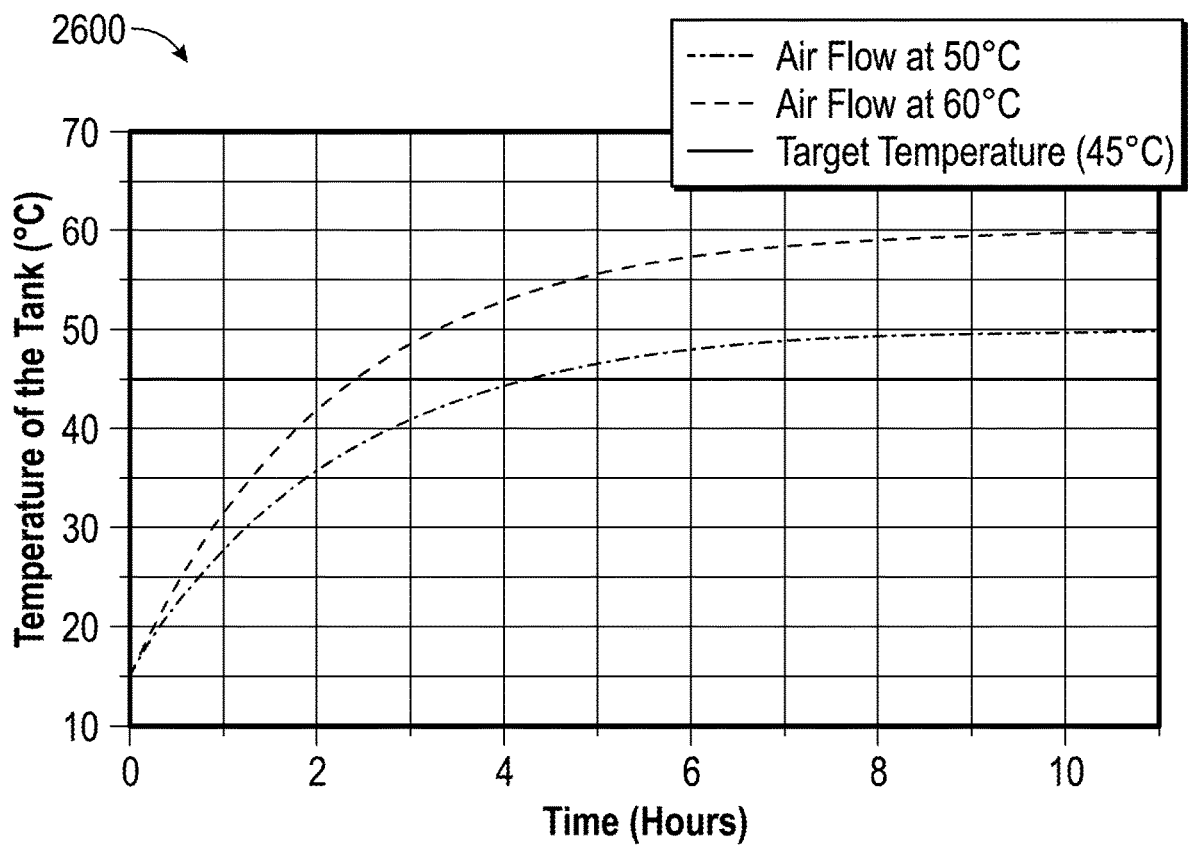
FIG. 26 is a graphical representation of a simulation to heat a water tank, according to one embodiment.

Referring now to FIG. 26, simulation software was used to estimate how long it would take to heat a 200 liter tank of water from 15 to 45 degrees Celsius using an 8 meter ×4 meter (equivalent to 500cubic meters per hour) roof and a flow rate of 1 meter per second. The results are shown in graph 2600 of FIG. 26 for air temperatures of 50 degrees Celsius and 60 degrees Celsius, and indicate that to achieve 45 degrees Celsius will take 4.2 and 2.4 hours respectively.

Figure 27:
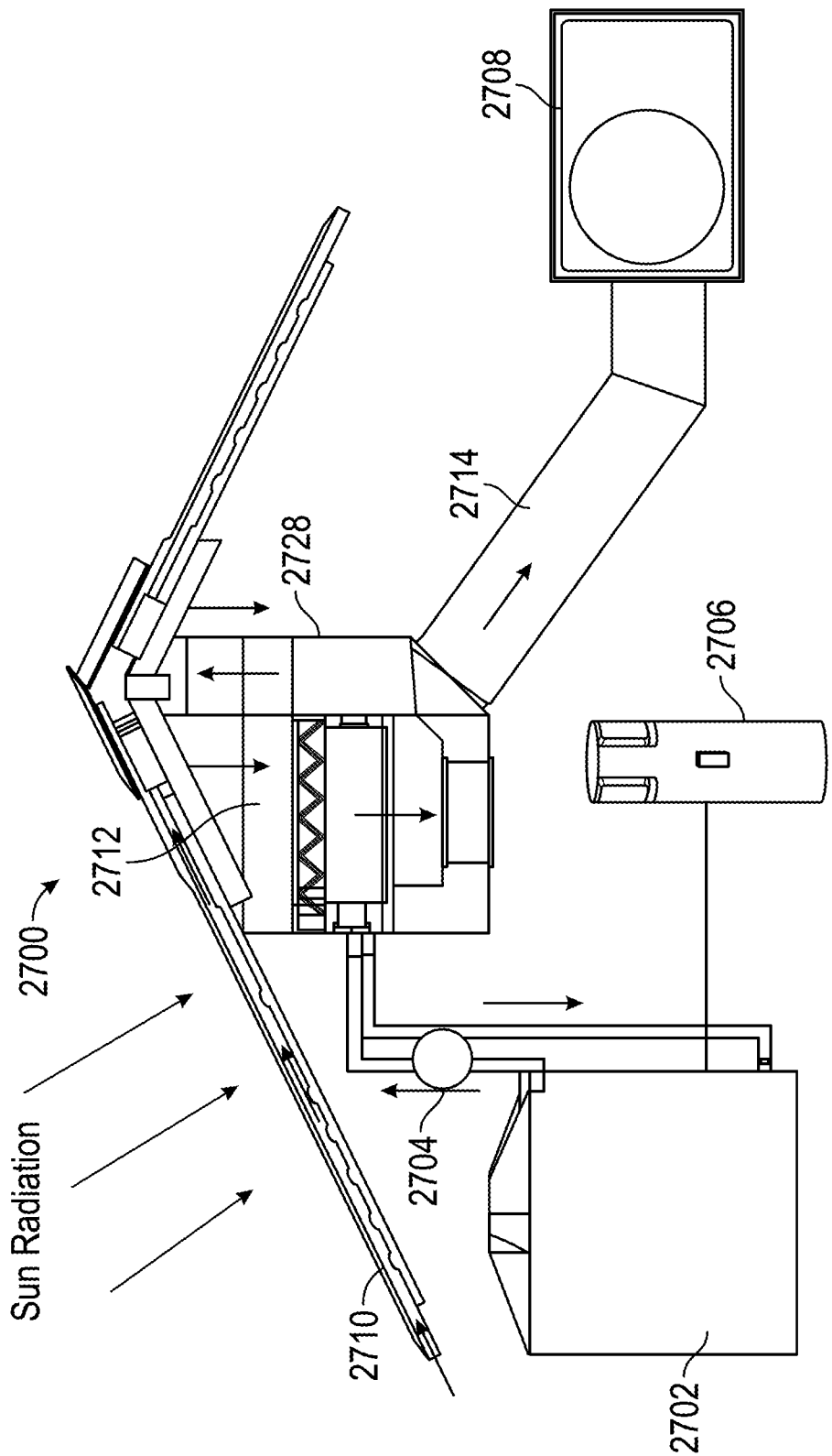
FIG. 27 is a schematic representation of a solar thermal control system, according to one embodiment.

Referring now to FIGS. 27-32, solar thermal control systems having various features and components are shown, according to various embodiments. Referring particularly to FIG. 27, a solar thermal control system 2700 (i.e., thermal control system) is shown, according to one embodiment. The solar thermal control system 2700 may include or be coupled to fan speed control components (e.g., fan speed control 2712, thermal collection unit 2728), water circulation components, including a water tank 2702 and a water pump 2704, space heating components (e.g., supply plenum 2714), traditional heating components (e.g., a water heater 2706), and traditional HVAC components (e.g., HVAC system 2708). The thermal collection unit 2728 may be similar to other thermal collection units, including units 104 and 800. The fan speed control 2712 may be used to control the speed by which air circulates through the control system 2700, including the thermal collection unit 2728.

The control system 2700 may also include several (overarching) functional features. For instance, the control system 2700 may include features that may be utilized for water heating, space heating, underfloor heating, pool and spa heating, and for other heating applications. The control system 2700 may also incorporate thermal-driven air conditioning features, which may be coupled to one or more pool and spa heating features or utilize various absorption technologies. The control system 2700 may also incorporate features for snow and ice dam removal from active roof areas. The control system 2700 may also incorporate features for directionally-dependent roof slope thermal optimization.

The control system 2700 may also include passive features, such as a vented roof 2710 to reduce thermal load during summer (i.e., warmer) months and features for reduction of thermal loss during the winter (i.e., colder) months. In one embodiment, the control system 2700 includes more than one operational mode, including a winter mode and a summer mode. The winter mode may include space heating, water heating, snow melting, and *Legionella* (i.e., bacteria) control. The summer mode may include roof cooling, water heating, air conditioning, pool and spa heating, and *Legionella* (i.e., bacteria) control.

Figure 28:
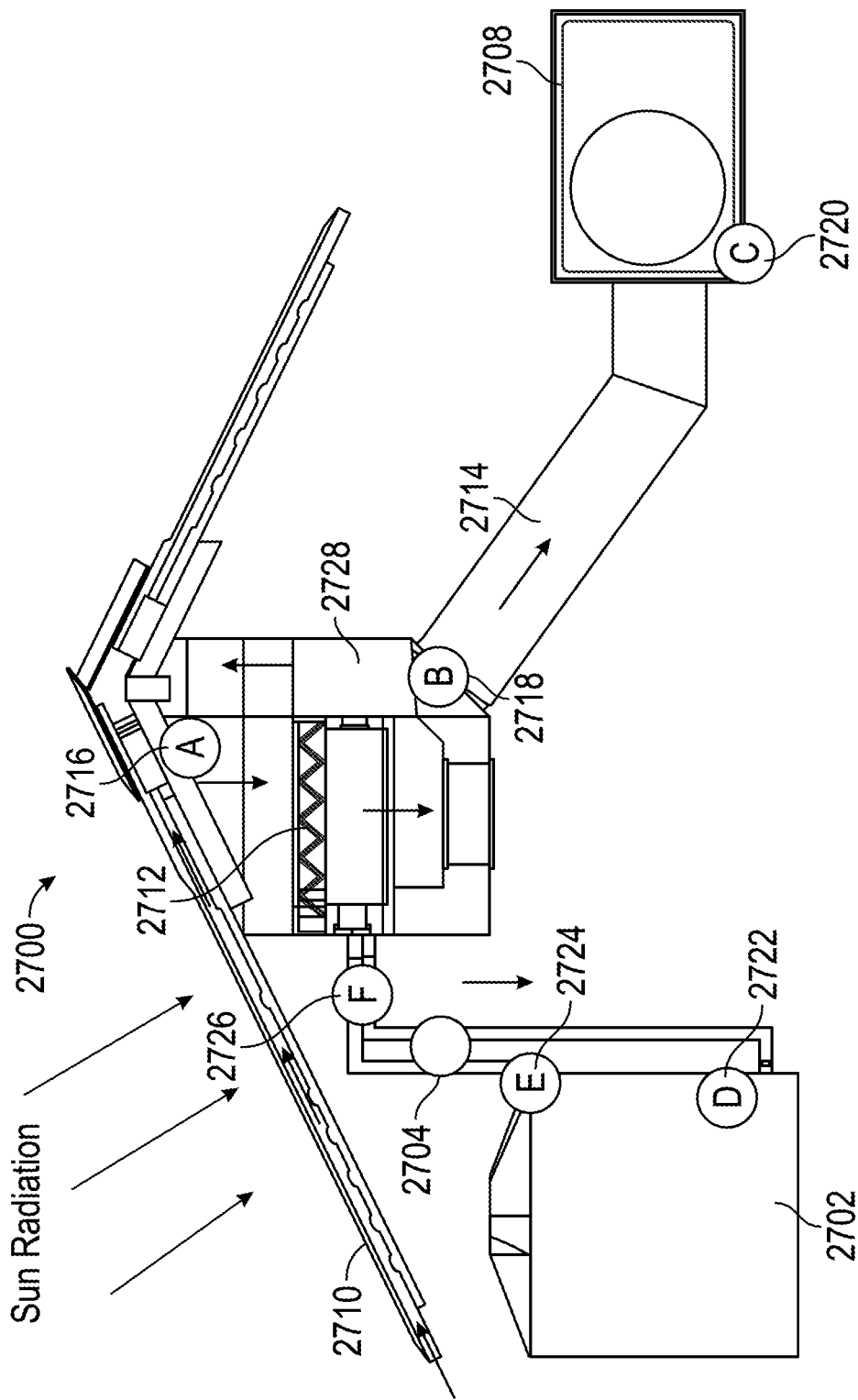
FIG. 28 is a schematic representation of a solar thermal control system having control sensors, according to one embodiment.

Referring now to FIG. 28, the solar thermal control system 2700 includes various control sensors, including an air temperature sensor 2716 (shown at A in FIG. 28) at or near the thermal collection unit 2728 and utilized by the fan speed control 2712, an exhaust air temperature sensor 2718 (shown at B in FIG. 28) at or near the supply plenum 2714, a room temperature sensor 2720 (shown at C in FIG. 28) at or near the HVAC system 2708, a bottom water tank temperature sensor 2722 (shown at D in FIG. 28) at or near the water tank 2702, a top water tank temperature sensor 2724 (shown at E in FIG. 28) at or near the water tank 2702, and a water flow sensor 2726 (shown at F in FIG. 28) at or near the water pump 2704. In other embodiments, the control system 2700 may also include additional control sensors, such as a solar global radiation sensor, an ambient temperature sensor, an external surface temperature sensor, a wind speed and/or direction sensor, and a rain sensor, among other sensors.

Figure 29:
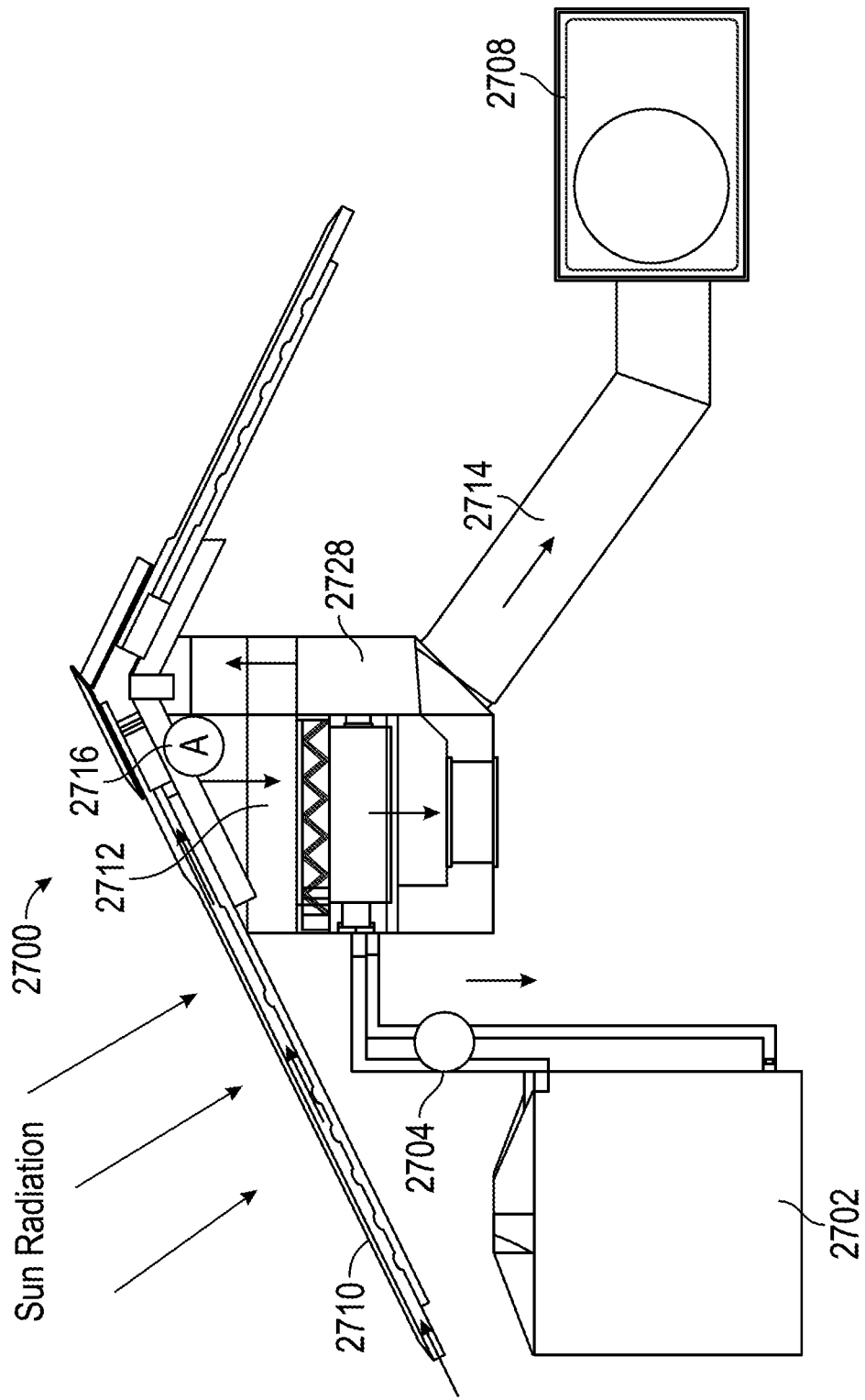
FIG. 29 is a schematic representation of a solar thermal control system having fan speed control, according to one embodiment.

Referring now to FIG. 29, the solar thermal control system 2700 is shown to include the fan speed control 2712 and the air temperature sensor 2716. The fan speed control 2712 (e.g., for the fan module 808 or the heat exchange module 806) may have a 0-10 volt (V) control signal. The fan speed control 2712 may be used to maintain a constant air flow and maximize the heat transfer through the control system 2700. The fan speed control 2712 may also be used to avoid overheating within the control system 2700. For instance, a first option for utilizing the fan speed control 2712 may be to maintain a constant air flow within the control system 2700. This first option may include turning on a fan of the control system 2700 (e.g., the fan module 808, the heat exchange module 806, etc.) to a pre-set speed when a minimum air temperature (e.g., 25° C.) is reached. The air temperature may be determined at or near the thermal collection unit 2728 based on signals received from the air temperature sensor 2716. A second option may include controlling the fan speed. The second option may include turning on the fan to a pre-set speed when the minimum air temperature is reached and controlling the speed of the fan when high temperatures to keep (below or at) a maximum temperature (e.g., 65° C.). A proportional-integral-derivative (PID) controller may be configured for the purposes of performing any of the functions within the first and second options.

Figure 30:
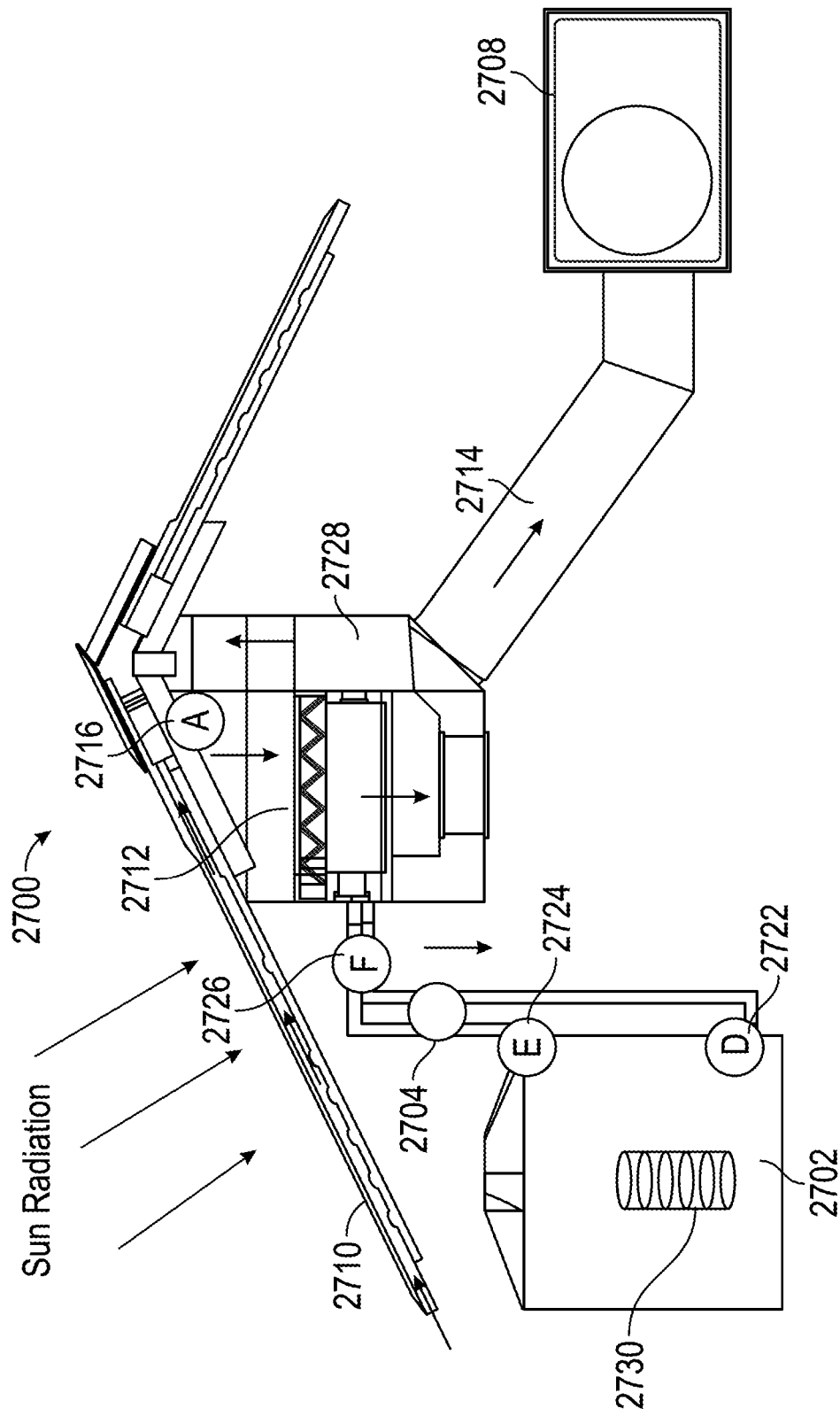
FIG. 30 is a schematic representation of a solar thermal control system having water circulation, according to one embodiment.

Referring now to FIG. 30, the solar thermal control system 2700 is shown to include various components related to the water circulation function of the control system 2700. At least the air temperature sensor 2716, the bottom water tank (cold) temperature sensor 2722, the top water tank (hot) temperature sensor 2724, the water flow sensor 2726, and a grid-tied (gas or electric) heating element 2730 may be utilized to perform the water circulation function. The control system 2700 may also include a water pump controller configured to activate the circulation water pump 2704 when an adequate temperature is reached in the air. The water pump controller may include a control signal having an on-off electromagnetic relay and a max switching current of 1 amp (A). In one embodiment, a water pump controller turns on the water pump 2704 to circulate the water when a minimum temperature difference is reached between the air (i.e., according to the air temperature sensor 2716) and the water in the tank 2702 (i.e., according to one or more of the temperature sensors 2722 and 2724). For instance, the water pump 2704 may be activated when an 8° C. temperature difference is reached, and then deactivated when a 4° C. temperature difference is reached.

Figure 31A:
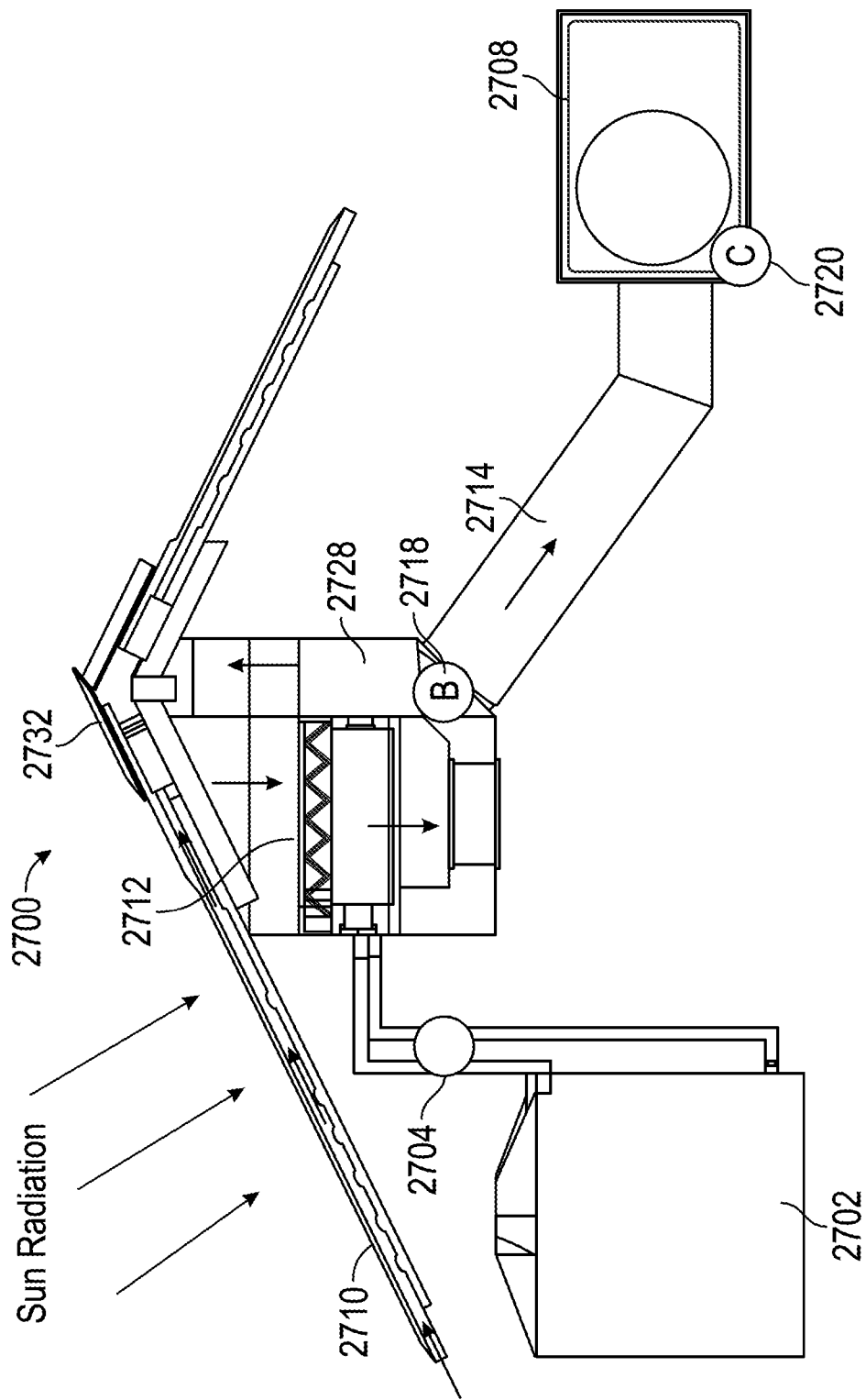
FIG. 31A is a schematic representation of a solar thermal control system having space heating, according to one embodiment.

Referring now to FIG. 31A, the solar thermal control system 2700 is shown to include various components related to the space heating function of the control system 2700. At least the exhaust air temperature sensor 2718, the room (or building) temperature sensor 2720, and the supply plenum 2714 may be utilized to perform the space heating function. As part of the space heating control requirement, the control system 2700 may vent exhaust air out of a (venting) ridge 2732 formed in the roof 2710. The ridge 2732 may be similar to the vented ridge 106.

Figure 31B:
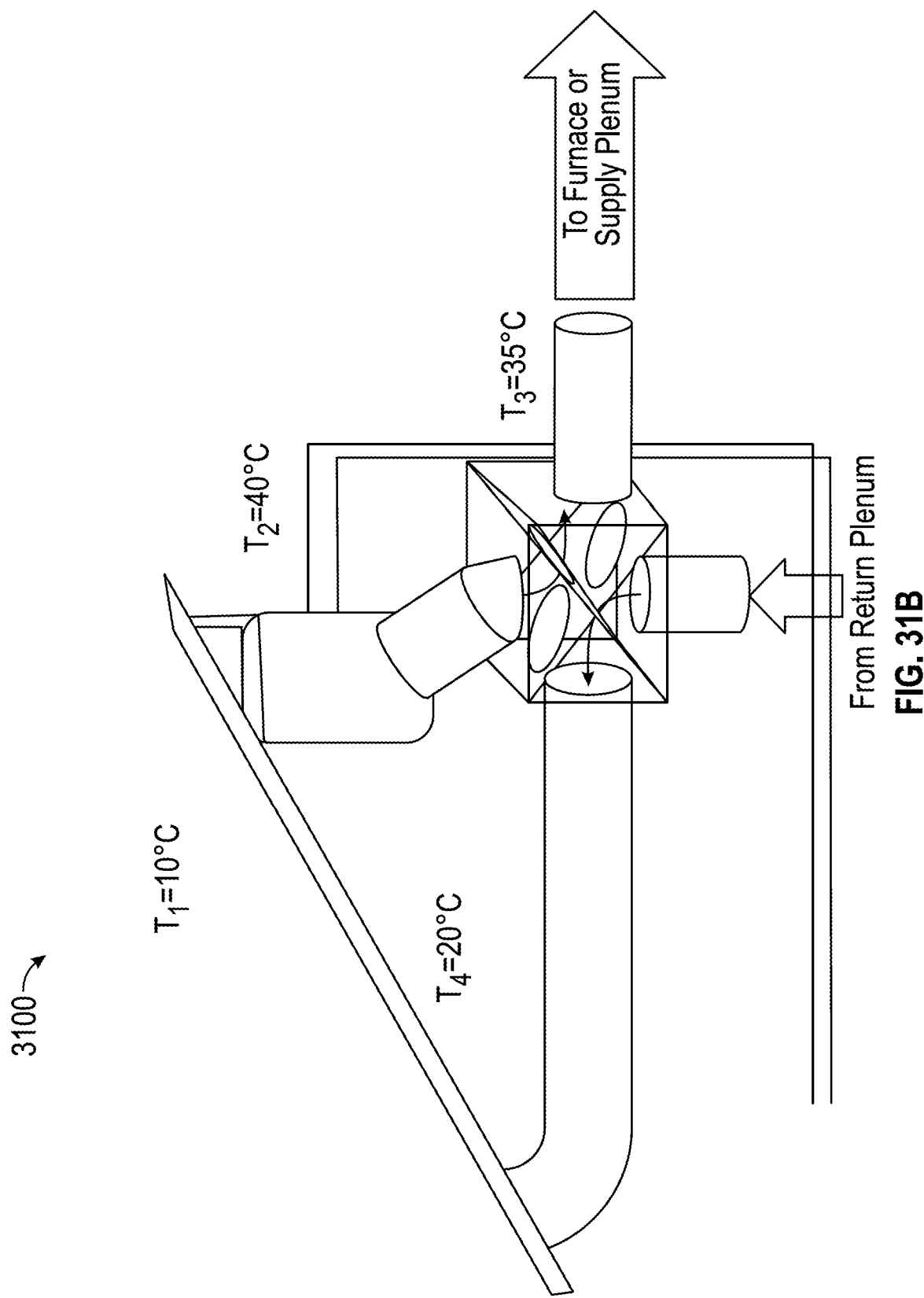
FIG. 31B is a schematic representation of a closed loop configuration for a solar thermal control system, according to one embodiment.

FIG. 31B shows another solar thermal control system 3100 that may be utilized to perform the space heating function described above. The solar thermal control system 3100 may be similar to the control system 2700 and include similar components. However, unlike the control system 2700, the control system 3100 has a closed loop configuration. Rather than vent the exhaust air to a ridge such as ridge 2732, the control system 3100 may recycle exhaust air to eaves of the associated building. Installations in higher elevations or further away from the equator, for instance, can benefit from a closed loop configuration to obtain increased temperatures, particularly in the colder seasons. Furthermore, a closed loop configuration can be outfitted for snow/ice melt.

The control systems 2700 and 3100 may include a thermostat that controls the space temperature of the associated building (e.g., the temperature measured by the room temperature sensor 2720). When the exhausting air is above the target temperature, the thermostat (or a controller) activates a damper that allows the exhaust air to be connected to a ventilation system. The ventilation system may be configured to vent the exhaust air out of a venting ridge (e.g., ridge 2732) or recycle the exhaust air to the eaves depending on whether the control system utilizes a closed loop configuration. The thermostat deactivates the air damper when the target temperature is reached in the building (as measured by the room temperature sensor 2720) or the exhaust air temperature (as measured by the exhaust air temperature sensor 2718) is below the temperature in the building (i.e., the space temperature). For snow/ice melt, the damper decouples thermal box exhaust from HVAC circulation to go directly to a roof eave manifold. A grid-tied heating element (e.g., element 2730) may be utilized to heat the water in the water tank 2702. The water pump 2704 may then be activated to bring hot water to a heat exchanger (e.g., the thermal collection unit 2728) to warm the circulating air.

Figure 32:
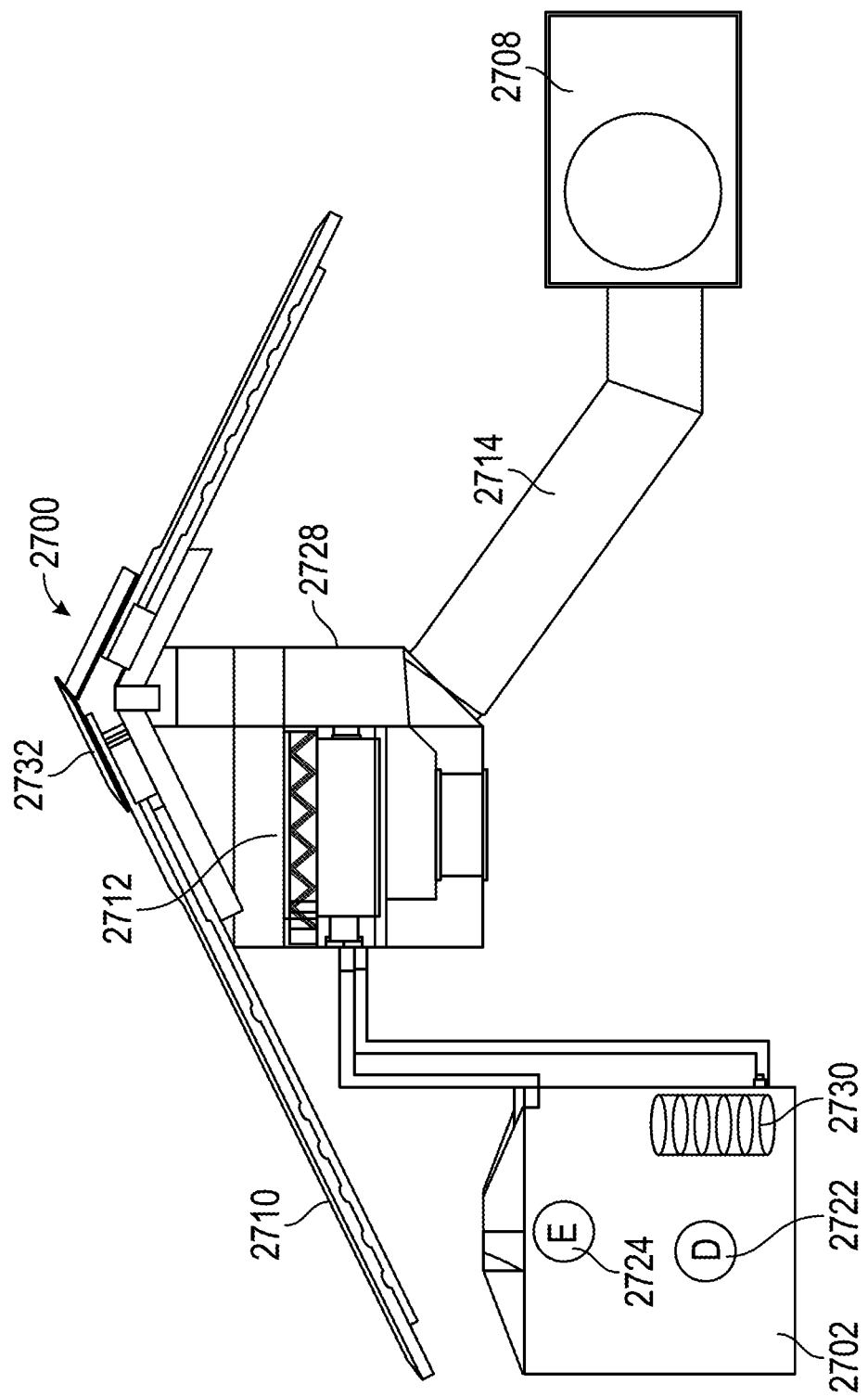
FIG. 32 is a schematic representation of a solar thermal control system having a hybrid water heating feature, according to one embodiment.

Referring now to FIG. 32, the solar thermal control system 2700 is shown, according to another embodiment. In this embodiment, the control system 2700 includes various components related to a hybrid/traditional water heating system or function of the control system 2700. In this embodiment, the control system 2700 may include a back-up or alternative water heater, such as an electric heater, a gas boiler, an oil boiler, a heat pump, or the like. The back-up water heater may be triggered to heat water in the water tank 2702 by a control signal having an on-off electromagnetic relay and a maximum switching current of approximately 10 amps (A). For instance, a controller may be coupled to the back-up water heater as part of a back-up water heating system and configured to control the back-up water heater by communicating a control signal. The back-up water heater may be triggered (i.e., to heat the water) at a pre-set time and may have a pre-set switch-on temperature and/or a pre-set switch-off temperature. In one embodiment, for instance, the back-up water heater may be triggered during a certain number of pre-set time periods (e.g., three time periods) within 24 hours. During one of these time periods, the back-up water heater (i.e., the back-up water heating system) may turn on when the temperature of a top part of the water tank 2702 (i.e., as measured by the top water tank temperature sensor 2724) drops below a pre-set switch-on temperature. The back-up water heater is then turned off when the temperature of the top part of the water tank 2702 reaches a (pre-set) switch-off temperature. In some embodiments, such as when the temperature sensor 2724 is not present, the temperature of a bottom part of the water tank 2702 (i.e., as measured by the bottom water tank temperature sensor 2722) may be used to determine whether the back-up water heater is turned on or off. In one embodiment, the traditional water heating system finishes the heating process of the water within the tank 2702.

Figure 33:
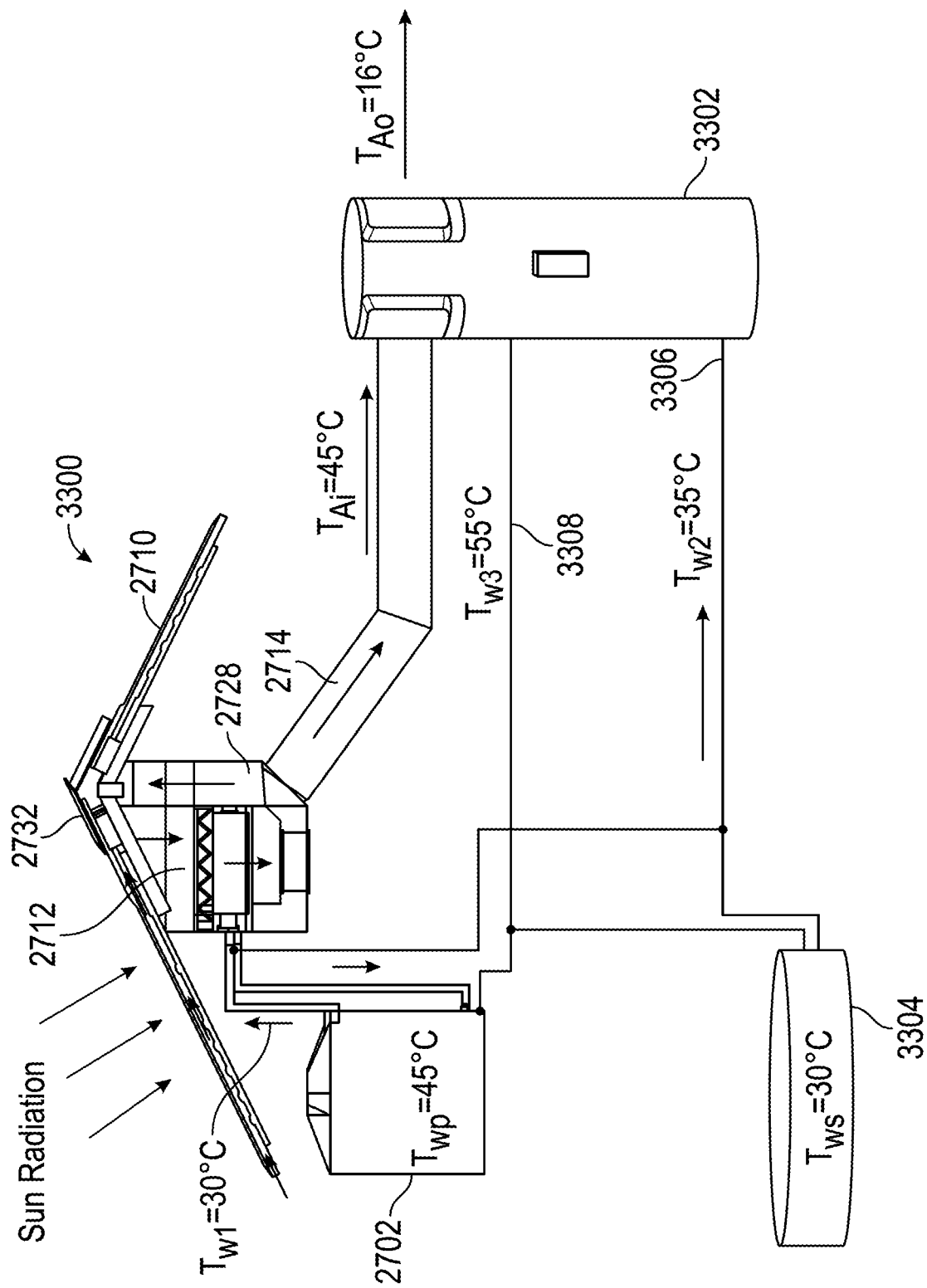
FIG. 33 is a schematic representation of a hybrid solar thermal control system, according to one embodiment.
Figure 34A:
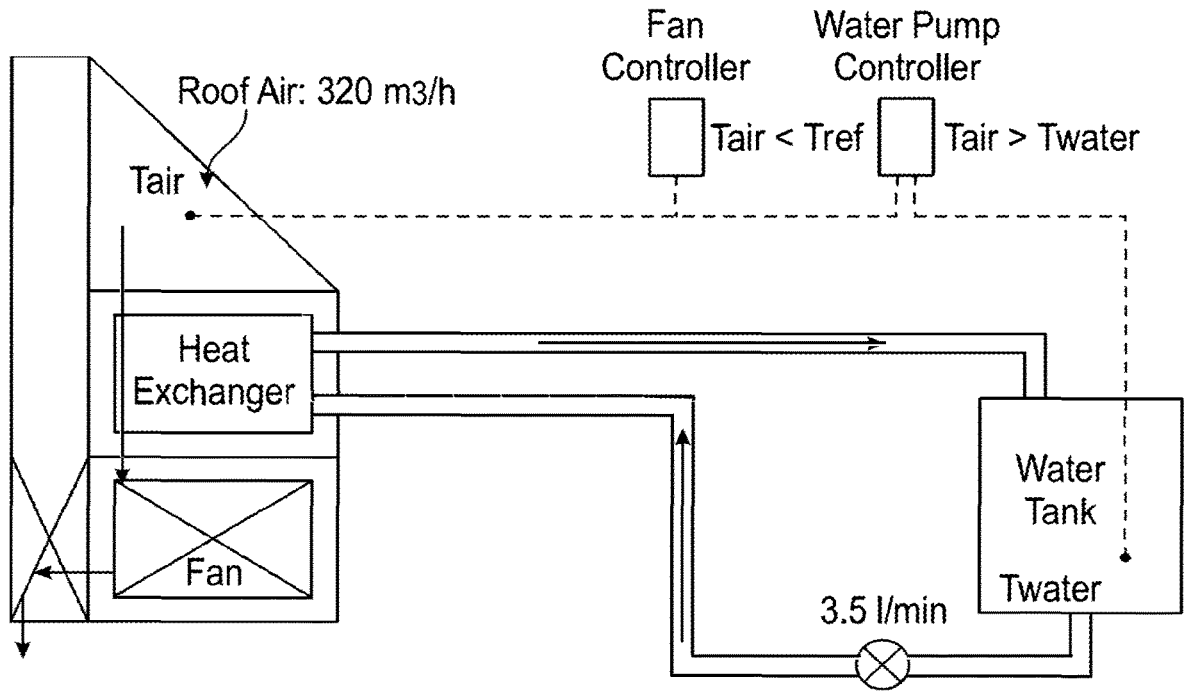
FIGS. 34A-D are schematic representations of various configurations for a solar thermal control system, according to one embodiment.
Figure 34B:
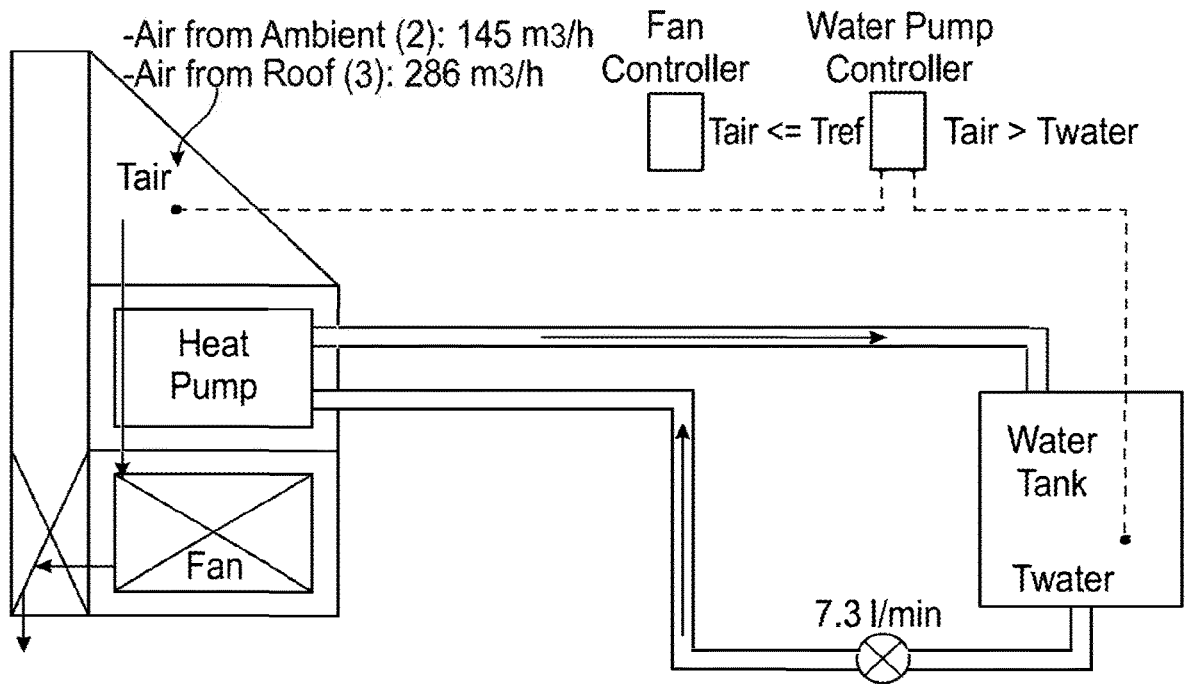
Figure 34C:
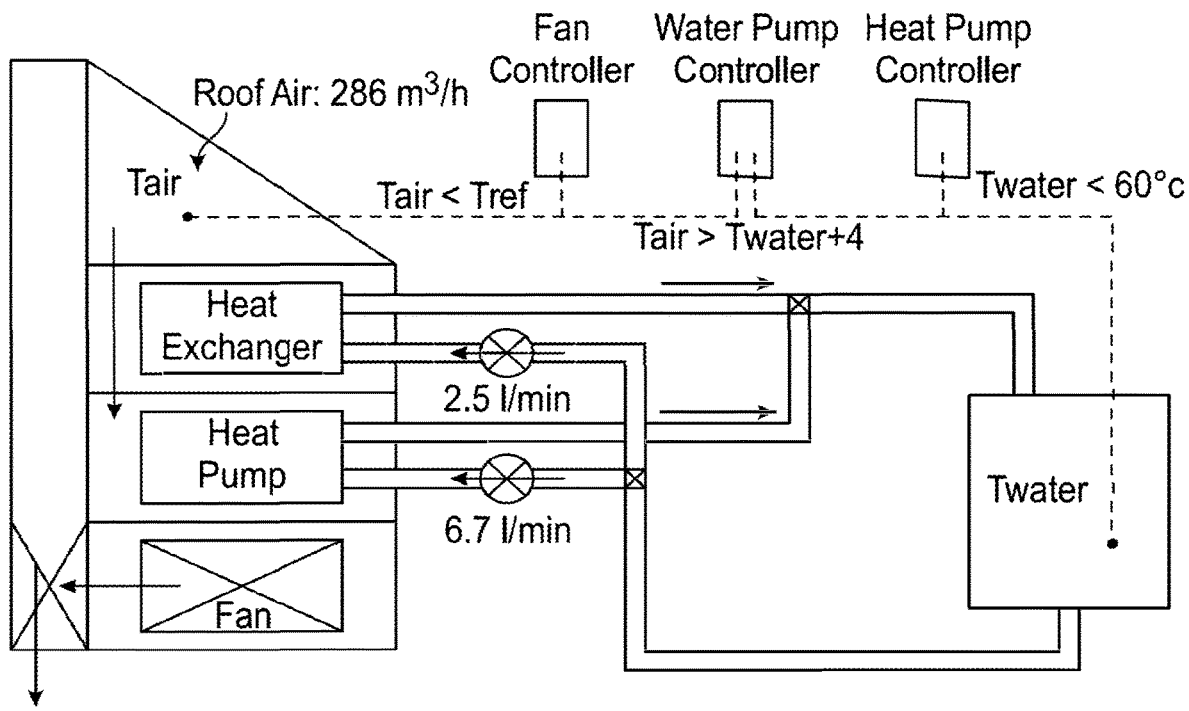
Figure 34D:
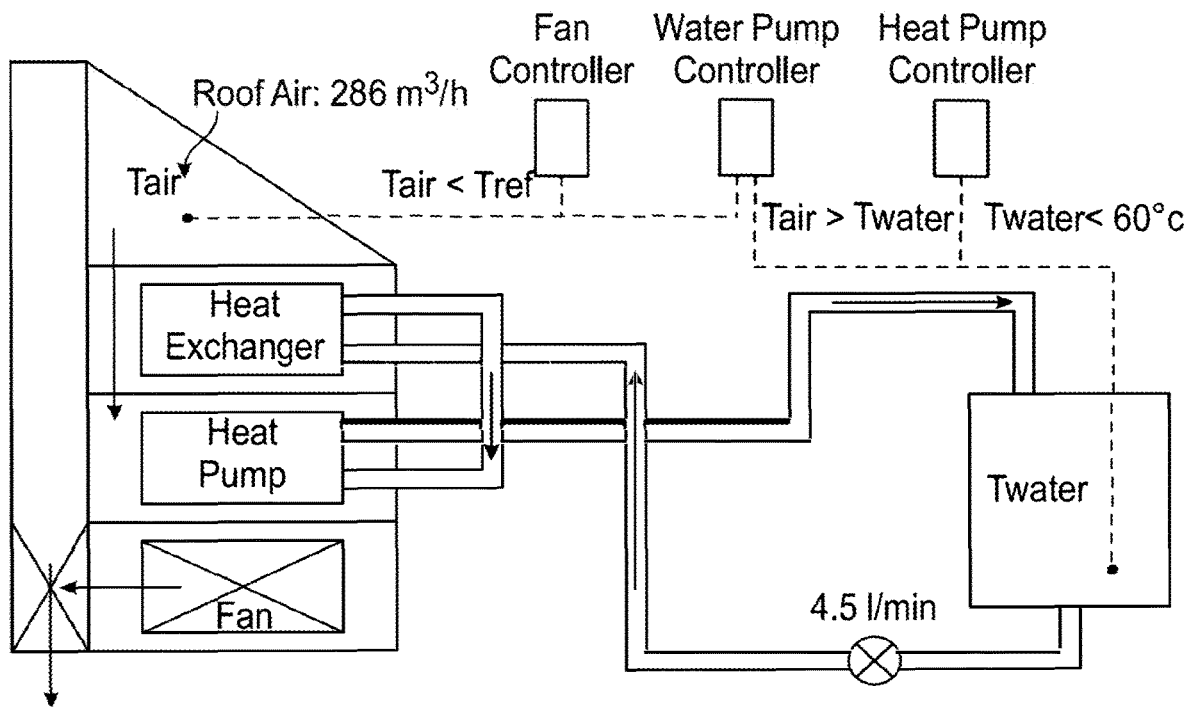

Referring now to FIG. 33, a hybrid water heating system 3300 is shown, according to one embodiment. The hybrid system 3300 may include any components of the control system 2700, as well as a heat pump water heater 3302 and a water storage tank 3304. The water heater 3302 includes a cold water inlet 3306 and a hot water outlet 3308. The water heater 3302 may supplement the water heating capabilities of a solar thermal control system (e.g., control system 2700). Warm exhaust air may be delivered from a thermal collection unit (e.g., unit 2728) to an air inlet of the water heater 3302 to improve the coefficient of performance (COP) of the water heater 3302. The COP may refer to a relationship between an amount of energy being received or utilized at a component and an amount of energy being provided (i.e., supplied) by the component. Damper to ambient air intake at the thermal collection unit may optimize the air temperature going from the thermal collection unit to the water heater 3302. The water heater 3302 may then exhaust cold air suitable for air conditioning. The water storage tank 3304 may be a storage tank without auxiliary heating, such as a swimming pool or spa. Warm/cold water from the storage tank 3304 may be delivered to a cold water inlet 3306 of the water heater 3302. The water heater 3302 then finishes the heating process and delivers hot water as required via a hot water outlet 3308. It should be noted that the hybrid system 3300 may be decoupled and assigned to specific roof faces. For instance, hot water may be used to heat a south face of the roof, and air conditioning with the heat pump and storage tank may be used on a north face of the roof.

The hybrid water heating system 3300, or another hybrid system having a solar thermal control system and a heat pump, may be used to extract heat from air. For instance, an air source water heat pump may be used as an auxiliary system in water heating and air cooling. Solar radiation via the thermal roof preheats the water, which may be stored in a primary potable water tank (e.g., tank 2702). The system 3300 then circulates the water through the heat pump that is extracting heat from thermal box exhaust or ambient air in order to (1) reach a desired temperature in the primary water tank, (2) dump heat from the air into the secondary storage tank 3304, and (3) provide cool, dry air to the living spaces associated with the system 3300. The exhaust air from the thermal box (e.g., the thermal collection unit 2728) is used as a source for the heat pump, increasing the COP of the heat pump. The heat pump may finish heating the water. An electric heating coil could be present in the primary hot water tank in case the heat pump is unable to reach the necessary or desired temperature.

Referring now to FIGS. 34A-D and FIGS. 35A-B, potential configurations for "hybrid" solar thermal control systems are shown and described, according to various embodiments. The first configuration includes a heat exchanger. The second configuration includes a heat pump with ambient air. The third configuration includes a heat pump with roof air. The fourth configuration includes a heat exchanger and a heat pump in parallel. The fifth configuration includes a heat exchanger and a heat pump in series. FIGS. 35A-B show performance statistics for the various configurations of hybrid solar thermal control systems shown in FIGS. 34A-D. Table 1 of FIG. 35A shows the overall performance of the various configurations, including the thermal energy (kWh), the energy consumed (kWh) and the coefficient of performance (COP) associated with the various configurations. Table 2 of FIG. 35B shows the water heating performance of the various configurations, including the initial water temperature (° C.), the final water temperature (° C.), and the time to reach the final water temperature (minutes).

Figure 36:
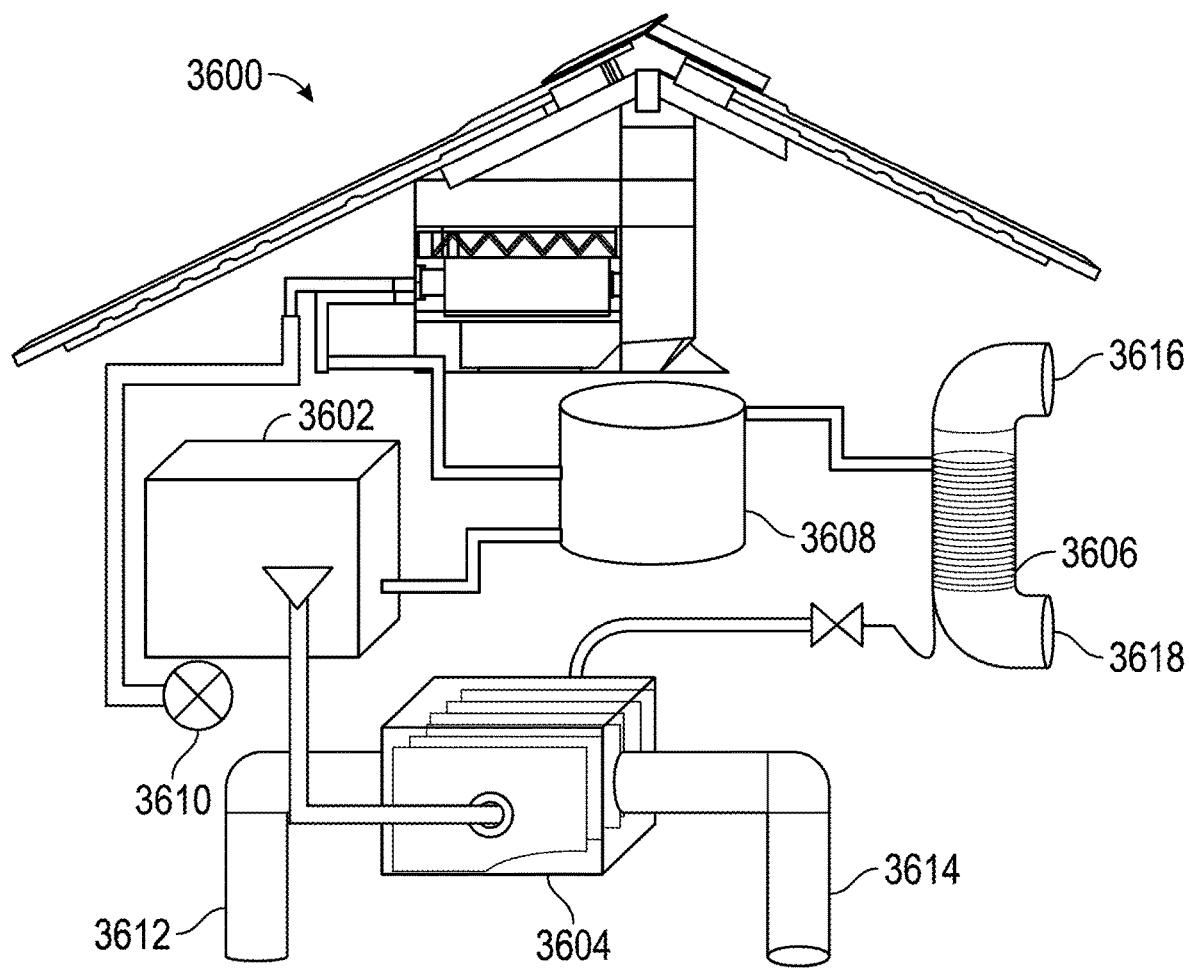
FIG. 36 is a schematic representation of a solar thermal control system having absorption-based space cooling, according to one embodiment.

Referring now to FIG. 36, a solar thermal control system 3600 having absorption-based space cooling is shown, according to one embodiment. The control system 3600 may be similar to any of the control systems described herein and may include any of the same components. The control system 3600 is shown to include an absorber 3602 and an evaporator 3604 having an air supply 3612 and an air return 3614. The air return 3614 may return air to the evaporator 3604 from a living space and the air supply 3612 may supply air to the living space from the evaporator 3604. The control system 3600 is also shown to include a condenser 3606 having a coolant supply 3616 and a coolant return 3618. The coolant return 3618 may return heated coolant to the condenser 3606 and the coolant supply 3616 may supply coolant to another location associated with the system 3600 (e.g., a water tank, ambient air, pool or spa, etc.). The control system 3600 also includes a heating element shown as generator 3608 and a water pump 3610. The heating element (i.e., the generator 3608) may be traditional gas or electric. Alternatively, the system 3600 may utilize a heat pump in parallel receiving solar heated air for heat supply to increase the COP.

Figure 37A:
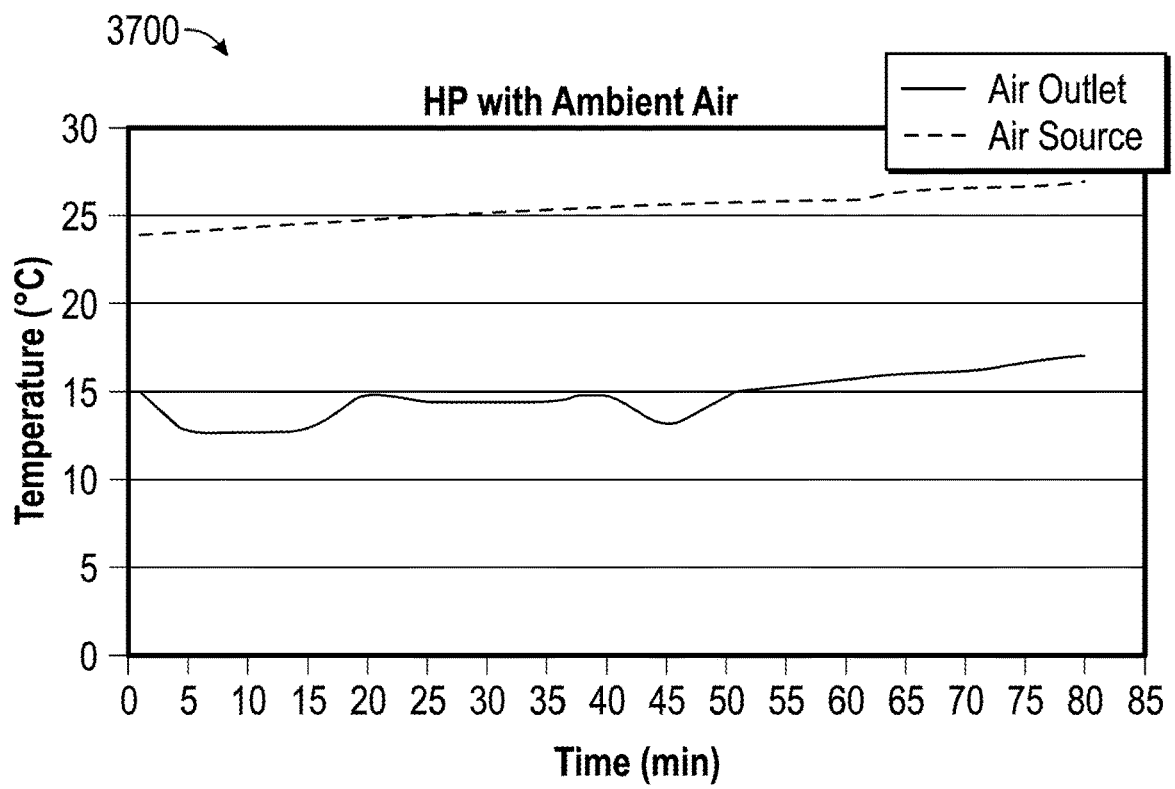
FIGS. 37A-D are graphical representations of heating performance associated with various configurations of a solar thermal control system, according to one embodiment.
Figure 37B:
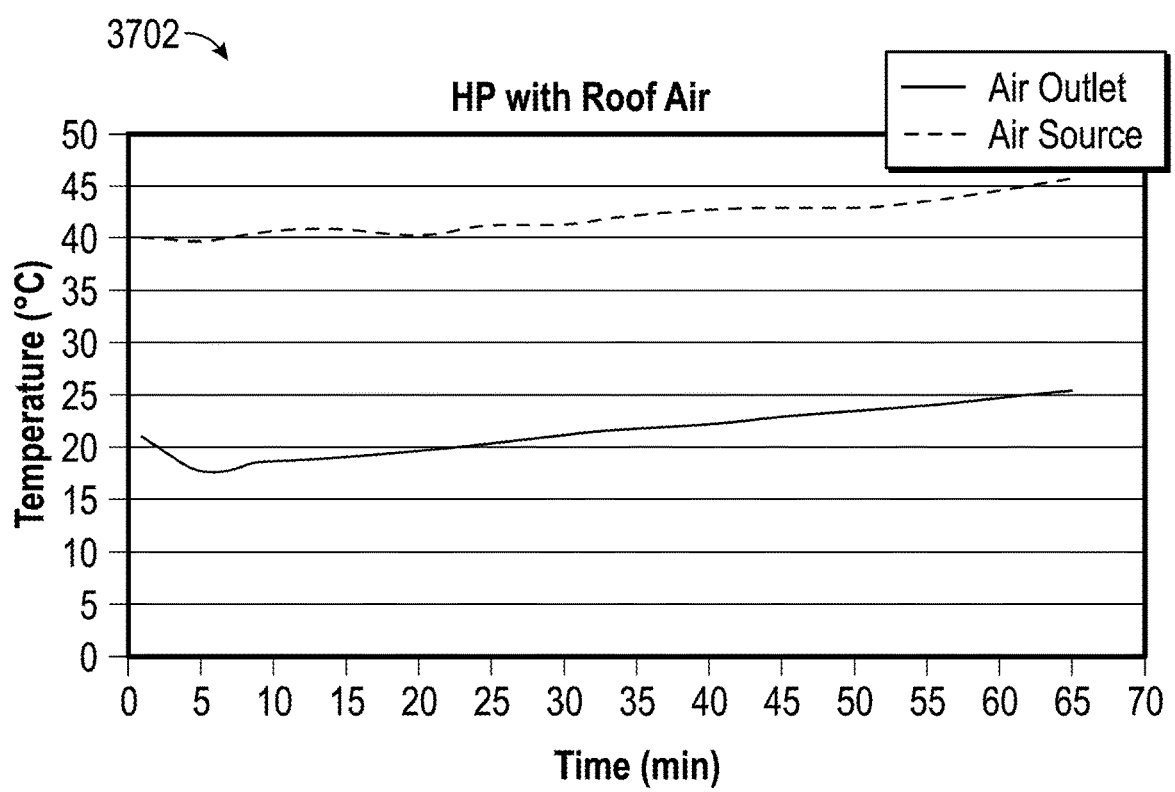
Figure 37C:
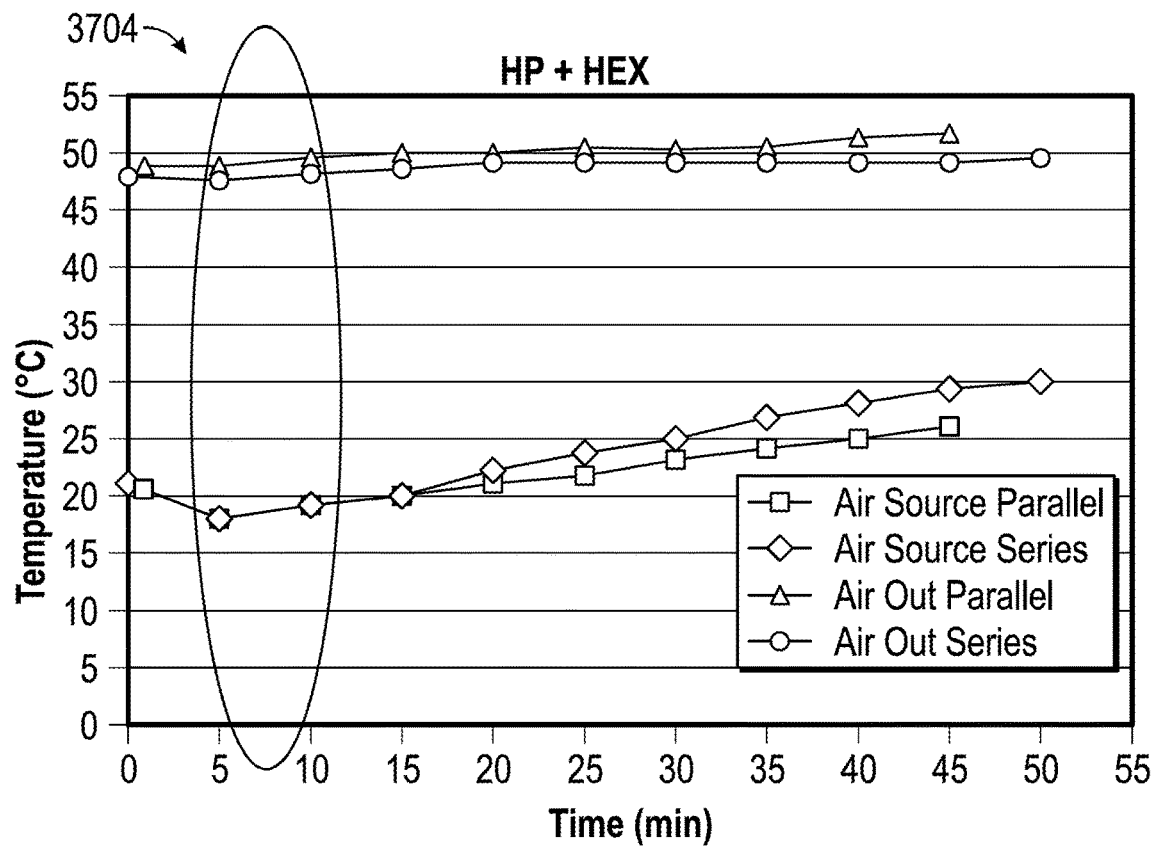
Figure 37D:
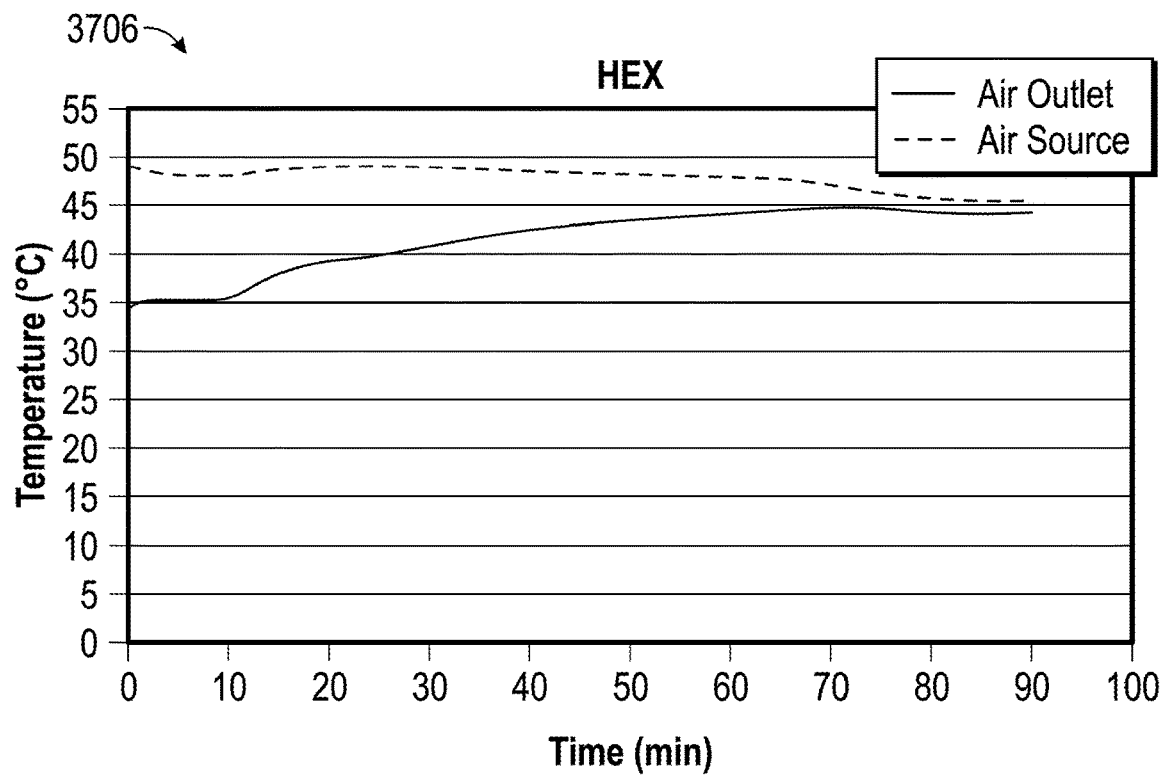

Referring now to FIGS. 37A-D, various performance statistics related to cooling for various types of solar thermal control systems are shown. Graph 3700 of FIG. 37A shows the heating performance of a control system having a heat pump with ambient air, including air temperatures at an air outlet and an air source of the heat pump over time. Graph 3702 of FIG. 37B shows the heating performance of a control system having a heat pump with roof air, again including air temperatures at an air outlet and an air source of the heat pump over time. Graph 3704 of FIG. 37C shows the heating performance of a control system having a heat exchanger and a heat pump. The graph 3704 includes air temperatures at an air outlet and an air source of the heating components over time, both when used in parallel and in series. Graph 3706 of FIG. 37D shows the heating performance of a control system having a heat exchanger, including air temperatures at an air outlet and an air source of the heat exchanger over time.

Figure 38A:
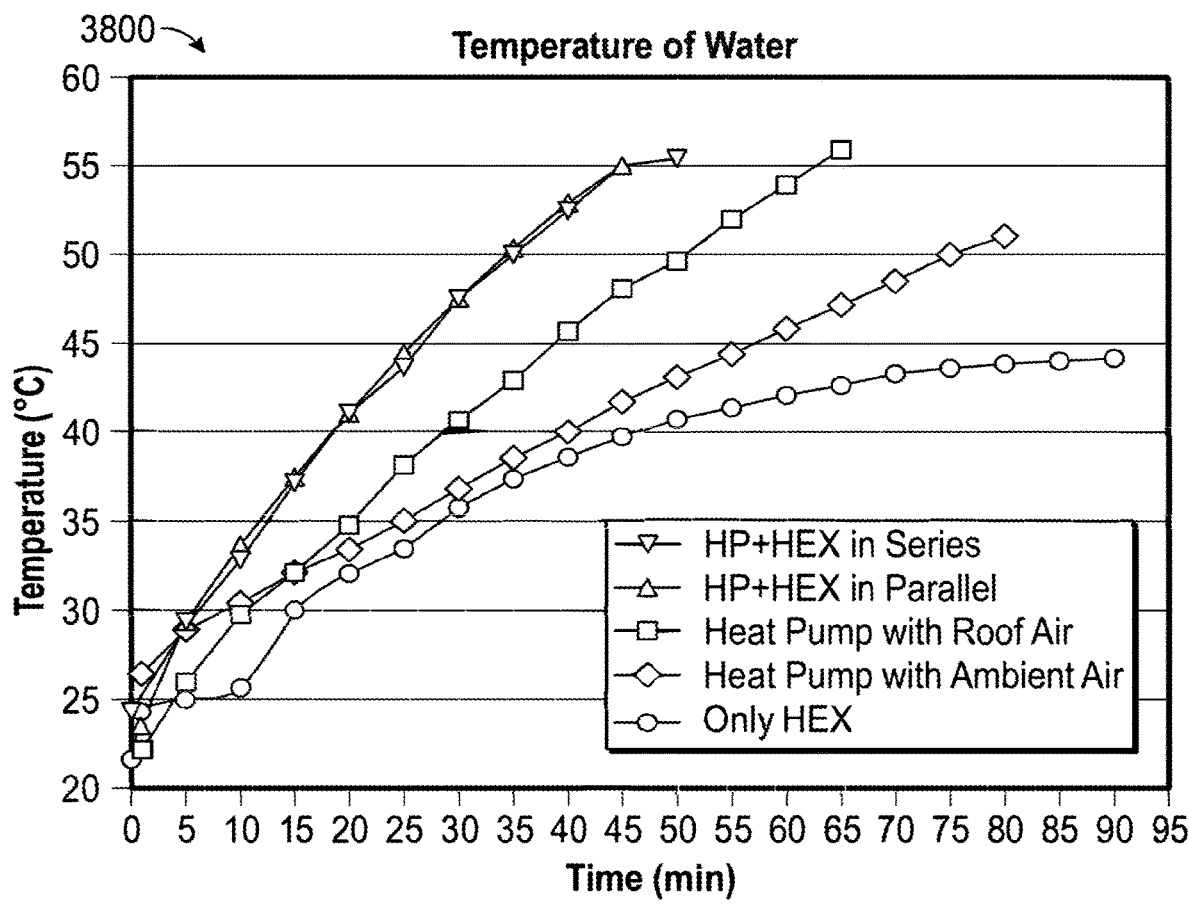
FIGS. 38A-B are graphical representations of performance statistics associated with various configurations of a solar thermal control system during the water heating process, according to one embodiment.
Figure 38B:
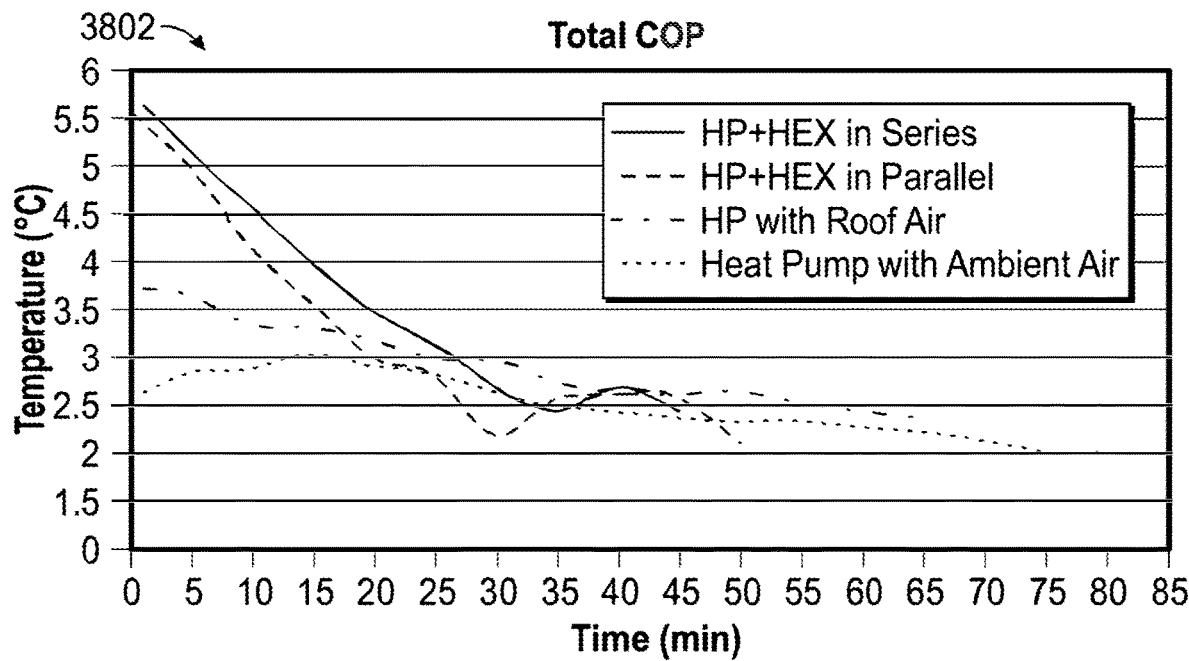

Referring now to FIGS. 38A-B, graphs 3800 and 3802 depict various performance statistics related to water heating for various types of solar thermal control systems. Graph 3800 of FIG. 38A depicts a temperature of water over time using the various water heating configurations, including control systems having a heat pump (HP) and a heat exchanger (HEX) in series, a heat pump and a heat exchanger in parallel, a heat pump with roof air, a heat pump with ambient air, and a heat exchanger only. Graph 3802 of FIG. 38B depicts a total COP (i.e., system COP) over time for each of the various water heating configurations during the water heating process, which may be based on the amount of energy being used by the water heating device(s) versus the amount of energy being produced or supplied by the water heating device(s).

Referring now to FIG. 39, a solar thermal control system 3900 is shown, according to one embodiment. The control system 3900 may be similar to control system 2700 or any other control system or roofing system disclosed herein. In this embodiment of the control system 3900, thermal energy is redirected within the system 3900 to another roof slope 3902 (e.g., a roof slope other than the one used to collect the thermal energy). For instance, the thermal energy may be used to melt snow or ice on the second roof slope. A similar system is shown in FIG. 16.

Figure 40:
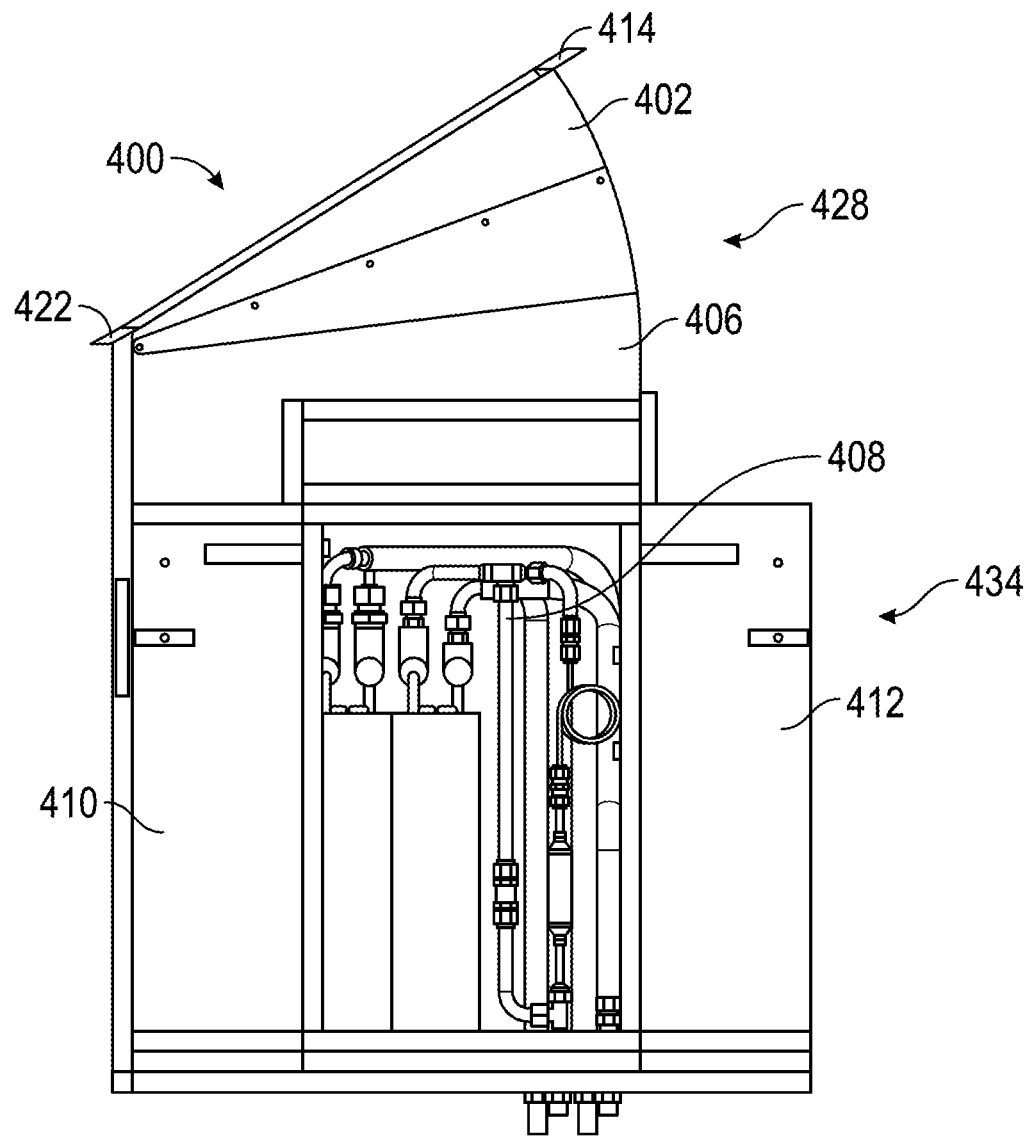
FIG. 40 is a side view of a thermal collection unit for the solar thermal control system, according to an exemplary embodiment.
Figure 41:
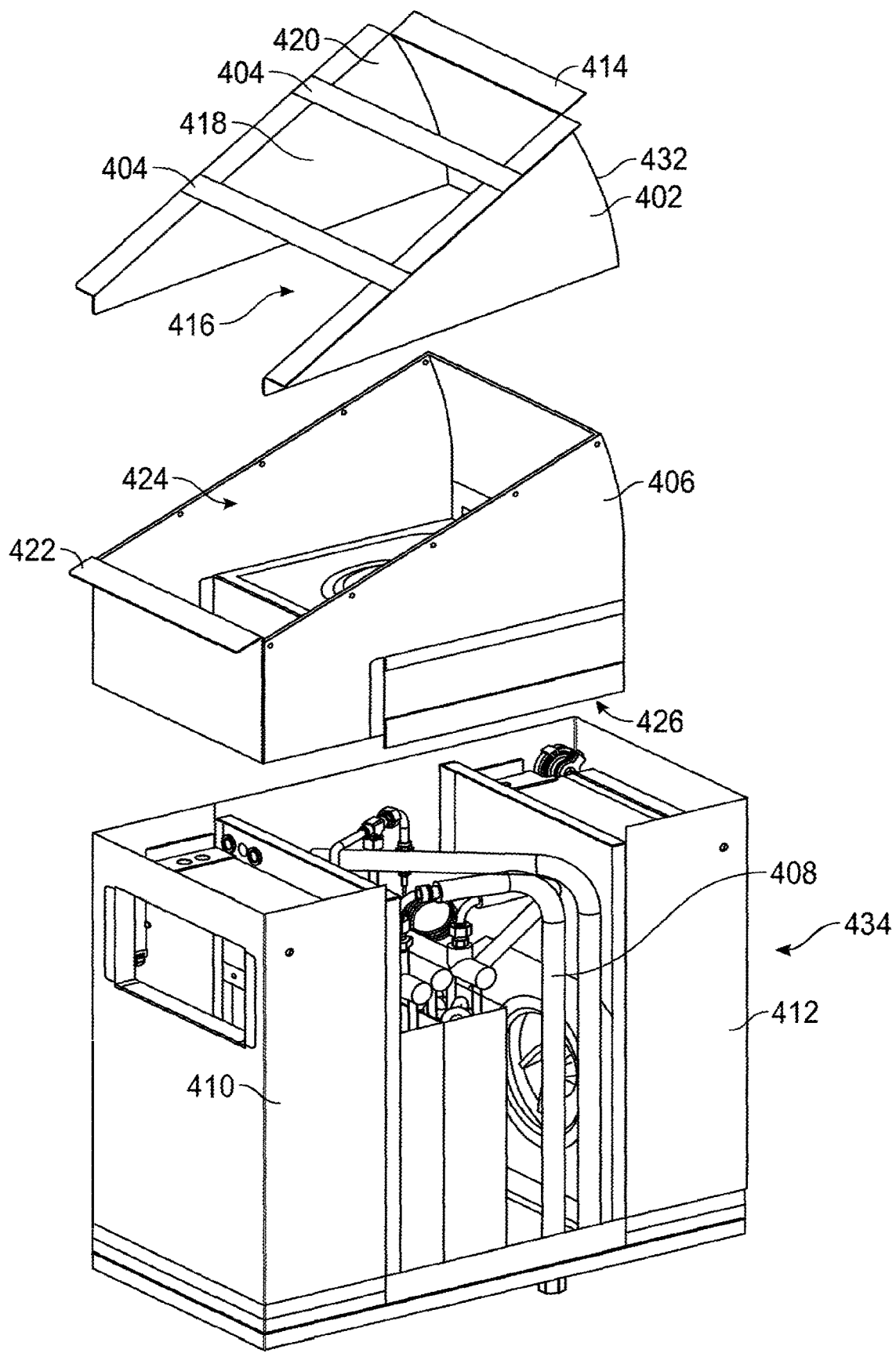
FIG. 41 is an exploded isometric view of the thermal collection unit of FIG. 40.

Referring now to FIGS. 40 and 41, a thermal collection unit 400 (i.e., thermal box, thermal exchange unit) is shown, according to an exemplary embodiment. The thermal collection unit 400 may be similar to any of the thermal collection units or modules described herein, including units 104, 800, 1302, 1502, 1602, and 2728. The thermal collection unit 400 may be configured to fluidly connect to a cavity such as cavity 108 in order to collect heated air directed from the cavity. The unit 400 may divert the heated air to heat water within an associated building or to otherwise provide heat or other energy to the building environment. The thermal collection unit 400 may also be configured to remove heat, and thus humidity (e.g., moisture), from the air. The dehumidified, cooled exhaust air may then be used to cool a habitable space of the associated building. The thermal collection unit 400 may be installed from the outside of an associated building in a manner similar to unit 104.

Figure 42:
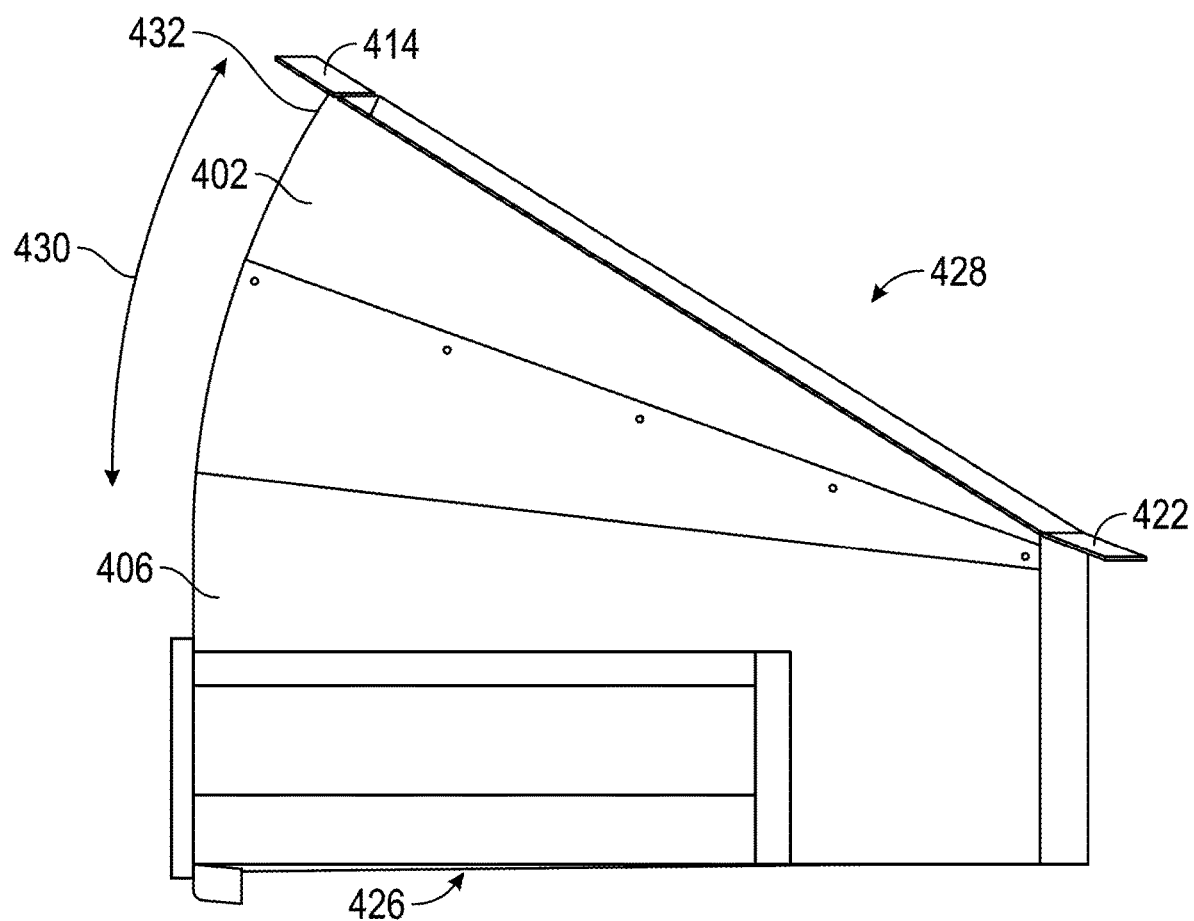
FIG. 42 is an isolated side view of a hood for the thermal collection unit shown in FIG. 40, according to an exemplary embodiment.

The unit 400 includes a hood 428 (i.e., a hood assembly), which may include a first (pivotable) hood section 402 (e.g., portion, segment, piece, part, etc.) and a second hood section 406 (i.e., a hood base). In the illustrated embodiment, the first hood section 402 is positioned atop and coupled to the second hood section 406. The hood 428 may be required to substantially match a pitch (e.g., slope, angle, steepness, etc.) of the roof of an associated building when the thermal collection unit 400 is installed to the building. The first hood section 402 may thus be configured to pivot relative to the second hood section 406 or another component of the unit 400 to substantially match the pitch of the associated roof without cutting or removing any portions of the unit 400. For instance, the first hood section 402 may be pivotally coupled to the second hood section 406 and configured to pivot relative to the second hood section 406 to match the pitch of a roof. In one embodiment, a flexible, accordion-like material may be used in at least one of the hood sections 402 and 406 to adapt the hood sections 402 and/or 406 to a variety of roof pitches. An example range of motion 430 for the first hood section 402 is shown in FIG. 42.

The hood 428 also includes ribs 404. The ribs 404 may be added to the hood 428 after the thermal collection unit 400 is installed to the building. The ribs 404 may provide fixing points for the roofing tiles 200. For instance, the fixing points 208 of one of the tiles 200 may be affixed or otherwise coupled to the ribs 404 in order to couple the tile 200 to the unit 400, which may stabilize the tile 200 and/or the unit 400. In one embodiment, the seal 116 is configured to couple to one of the ribs 404 on a first end and couple to the roofing membrane 102 on a second end in order to form an approximately airtight seal between the membrane 102 and the thermal collection unit 400. The hood 428 also includes flanges 414 and 422 that may be used to fix (i.e., attach) the thermal collection unit 400 to the roof of a building. The flange 414 may be located on the first hood section 402 and the flange 422 may be located on the second hood section 406.

The hood 428 also includes openings 416, 418, and 420 positioned between each of the ribs 404 and within the first hood section 402. The openings 416, 418, and 420 may be configured to receive air from the cavity 108 and/or to divert or exhaust air outside of the building through an extraction point at the vented ridge 106. In an exemplary embodiment, the thermal collection unit 400 is configured to collect or receive air through the openings 416 and 418 and send air to the vented ridge 106 through the opening 420. In another embodiment, air is exhausted to lower portions of the roof under the membrane 102 to form a closed system. Once received within the first hood section 402, air may be diverted into the building through the second hood section 406. A top opening 424 of the second hood section 406 is configured to receive air from the first hood section 402 and the air may be diverted into the associated building through a bottom opening 426 of the second hood section 406.

The thermal collection unit 400 also includes a base portion 434 coupled to the hood 428. The base portion 434 includes a heat exchange module 408 configured to receive air from the hood 428. The base portion 434 also includes a fan module 412 which may include a fan configured to drive the airflow received from the cavity 108 into the building. The fan may also be configured to drive the airflow in the opposite direction, such as back through the hood 428 and through an extraction point of the vented ridge 106. The base portion 434 also includes a ducting module 410 configured to sit beneath the vented ridge 106 and direct or allow excess air to be exhausted or vented through one or more extraction points of the vented ridge 106.

Referring now to FIG. 42, a range of motion for the hood 428 is shown. As shown, the hood 428 (e.g., the first hood section 402) may include a back portion 432 configured to enable the first hood section 402 to pivot (e.g., rotate, extend, stretch, etc.) relative to another component of the unit 400. For example, the back portion 432 (or another component of the hood 428) may be made from a flexible accordion-like material in order to adjust the pitch of the hood 428. In an example embodiment, the first hood section 402 has a range of motion of at least range 430 shown in FIG. 42. In some embodiments, the first hood section 402 may be have a pivotable range extending from a pitch (i.e., angle) that is substantially flat with the second hood section 406 to a pitch in which the first hood section 402 is substantially vertical and parallel to a front edge of the second hood section 406.

Any of the control systems described herein may include additional control functions, including anti-*legionella* for water not treated by chlorine. In order to avoid the bacteria occurring in the water tank when the temperature in the top of the tank is lower for a period of team, a controller will check the temperature of the water every seven (7) days automatically. If the temperature is never over the target temperature (e.g., 70° C.) during this period, the backup system is triggered to heat the water to the target temperature, where bacteria is killed. After that, the function is reset. Other additional control functions may include air conditioning (requires the use of a heat pump) using the same control system as the back-up system, snow melting using a reversible fan or air recirculation, pool/spa heating using the same control system as the water circulation, thermal energy measuring, electric consumption, and photovoltaic energy measuring.

According to an exemplary embodiment, the solar thermal system of the present disclosure advantageously integrates exterior panels of a building with an air flow chamber (e.g., a cavity) to use solar heating of the air to provide or augment a heating source for the building. The solar thermal system is shown by way of example to include roof panels (e.g., tiles), but the system may be integrated in other building materials (e.g., siding, facades, etc.). All such variations are intended to be within the scope of this disclosure.

The construction and arrangement of the solar thermal system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A solar thermal control system, comprising:
    a membrane configured to receive solar energy, wherein the membrane is configured to form a cavity between the membrane and an outer surface of a structure by coupling to the outer surface, and wherein the solar energy is configured to heat air within the cavity;
    a thermal collection unit configured to be coupled to the outer surface about an opening formed in the outer surface of the structure, covered by the membrane, and connected to the cavity; and
    a ducting system coupled to the thermal collection unit and configured to direct air from the thermal collection unit to at least one of the interior of the structure and a vent;
    wherein the membrane comprises a plurality of overlapping tiles, each of the plurality of overlapping tiles comprising a plurality of feet;
    wherein each of the plurality of feet includes a rounded leading edge and is approximately U-shaped to reduce air drag within the cavity;
    wherein the thermal collection unit comprises a hood having flanges configured to attach to the outer surface; and
    wherein the thermal collection unit is configured to be coupled to the outer surface via the flanges.

2. The system of claim 1,
    wherein each of the plurality of feet is integrated within one of the plurality of overlapping tiles; and
    wherein the plurality of feet of one of the plurality of overlapping tiles are arranged in a plurality of columns, each of the plurality of columns arranged so as to have one of the plurality of feet that is offset relative to one of the plurality of feet of another of the plurality of columns.

3. The system of claim 2, wherein each of the plurality of overlapping tiles comprises an overlapping section and an underlapping section;
    wherein each of the plurality of feet is included in the underlapping section of one of the plurality of overlapping tiles;
    wherein the underlapping section of each of the plurality of overlapping tiles is configured to be overlapped by the overlapping section of another of the plurality of overlapping tiles; and
    wherein the overlapping section of each of the plurality of overlapping tiles is configured to overlap the underlapping section of another of the plurality of overlapping tiles.

4. The system of claim 3, wherein the overlapping section of each of the plurality of overlapping tiles covers the underlapping section of an adjacent one of the plurality of overlapping tiles.

5. The system of claim 1, wherein the flanges are configured to match a pitch of the outer surface.

6. The system of claim 1, wherein the thermal collection unit comprises a heat exchange module and a fan module configured to drive air through the system.

7. The system of claim 1, wherein the ducting system is a closed system configured to capture solar heat via a surface of the membrane and transfer the solar heat to another medium via a heat transfer module.

8. The system of claim 1, wherein the ducting system is a closed system configured to receive heat from another medium via a heat transfer module and release the heat via a surface of the membrane.

9. The system of claim 1, wherein the membrane surface temperature is influenced by energy transfer to maintain a membrane temperature range that optimizes the power output of photovoltaic cells that are in contact with the membrane.

10. The system of claim 9, wherein the energy transfer comprises directing flow of air.

11. The system of claim 10, wherein the photovoltaic cells are attached to the membrane.

12. The system of claim 2, wherein the plurality of feet are located such that a velocity profile of the air within the cavity is substantially symmetrical about an axis bisecting the cavity.

13. A solar thermal control system, comprising:
a membrane configured to receive solar energy, wherein the membrane is configured to form a cavity between the membrane and an outer surface of a structure by coupling to the outer surface, and wherein the solar energy is configured to heat air within the cavity;
a thermal collection unit configured to be coupled to the outer surface about an opening formed in the outer surface of the structure, covered by the membrane, and connected to the cavity; and
a ducting system coupled to the thermal collection unit and configured to direct air from the thermal collection unit to at least one of the interior of the structure and a vent;
wherein the membrane comprises a plurality of overlapping tiles, each of the plurality of overlapping tiles comprising a plurality of support structures;
wherein each of the plurality of support structures is integrated within one of the plurality of overlapping tiles;
wherein the plurality of support structures of one of the plurality of overlapping tiles are arranged in a plurality of columns, each of the plurality of columns arranged so as to have one of the plurality of support structures that is offset relative to one of the plurality of support structures of another of the plurality of columns;
wherein each of the plurality of support structures includes an upstream face having a rounded leading edge and each of the plurality of support structures is approximately U-shaped to reduce air drag within the cavity;
wherein the thermal collection unit comprises a hood having flanges configured to attach to the outer surface; and
wherein the thermal collection unit is configured to be coupled to the outer surface via the flanges.

14. The system of claim 13, wherein the plurality of support structures are located such that a velocity profile of the air within the cavity is substantially symmetrical about an axis bisecting the cavity.

15. A method of heating a building having an outer surface using a solar thermal control system having a plurality of feet disposed on the outer surface along a first direction and a second direction orthogonal to the first direction, a membrane supported by the plurality of feet above the outer surface and forming a cavity between the membrane and the outer surface, the membrane including a plurality of overlapping tiles and each of the plurality of feet includes a rounded leading edge and is approximately U-shaped to reduce air drag within the cavity, and a thermal collection unit including a hood having flanges configured to attach to the outer surface and configured to be coupled to the outer surface via the flanges, the method comprising:
routing air from the cavity through a first gap formed between the plurality of feet disposed along the first direction to the thermal collection unit;
routing air from the cavity through a second gap formed between the plurality of feet disposed along the second direction to the thermal collection unit; and
directing air from the thermal collection unit that is received from the cavity, underneath the outer surface and into an interior of the building.

16. The method of claim 15, wherein at least one of routing air from the cavity through the first gap or routing air from the cavity through the second gap induces a cross-flow within the cavity and between the outer surface and the membrane.

17. The method of claim 15, wherein routing air from the cavity through the first gap and routing air from the cavity through the second gap creates a velocity profile of the air within the cavity that is substantially symmetrical about an axis bisecting the cavity.

* * * * *